United States Patent
Chang

(10) Patent No.: US 12,548,541 B2
(45) Date of Patent: Feb. 10, 2026

(54) SOUND SYSTEM FOR VEHICLE AND METHOD FOR IMPLEMENTING SOUND OF THE VEHICLE

(71) Applicants: Hyundai Motor Company, Seoul (KR); Kia Corporation, Seoul (KR)

(72) Inventor: Kyoung Jin Chang, Gyeonggi-Do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 296 days.

(21) Appl. No.: 18/385,695

(22) Filed: Oct. 31, 2023

(65) Prior Publication Data

US 2024/0420673 A1     Dec. 19, 2024

(30) Foreign Application Priority Data

Jun. 13, 2023  (KR) .......................... 10-2023-0075609

(51) Int. Cl.
| | |
|---|---|
| *G10K 11/175* | (2006.01) |
| *G01P 15/00* | (2006.01) |
| *G06F 3/16* | (2006.01) |
| *G10L 25/18* | (2013.01) |
| *G10L 25/30* | (2013.01) |
| *G10L 25/51* | (2013.01) |

(52) U.S. Cl.
CPC .......... *G10K 11/1754* (2020.05); *G01P 15/00* (2013.01); *G06F 3/165* (2013.01); *G10L 25/18* (2013.01); *G10L 25/30* (2013.01); *G10L 25/51* (2013.01)

(58) Field of Classification Search
CPC ..... G10K 11/1754; G10L 25/18; G10L 25/30; G10L 25/51; G06F 3/165; G01P 15/00
See application file for complete search history.

(56) References Cited

U.S. PATENT DOCUMENTS

| | | | |
|---|---|---|---|
| 10,065,561 B1 * | 9/2018 | Bastyr ................... | G10K 15/02 |
| 11,514,884 B2 | 11/2022 | Chang | |
| 11,671,754 B2 | 6/2023 | Chang | |
| 11,720,321 B2 | 8/2023 | Chang et al. | |
| 2009/0249942 A1 * | 10/2009 | Suzuki .................. | G06F 16/683 |
| | | | 84/602 |
| 2021/0407491 A1 | 12/2021 | Chang | |

(Continued)

FOREIGN PATENT DOCUMENTS

| | | | | |
|---|---|---|---|---|
| CN | 101556797 B | * | 1/2012 | ............. G11B 20/10 |
| CN | 111354331 B | * | 6/2024 | ......... G10K 11/1785 |

(Continued)

*Primary Examiner* — David L Ton
(74) *Attorney, Agent, or Firm* — Fox Rothschild LLP

(57) ABSTRACT

A sound system for a vehicle is configured to implement a soundscape that matches an environment around the vehicle. The sound system includes a noise meter that measures environmental noise generated around the vehicle, a vibration meter that measures vibration generated by the vehicle, and a processor connected with the noise meter and the vibration meter. The processor determines a noise type by analyzing features of the vibration and the environmental noise respectively measured by the vibration meter and the noise meter, selects a sound source matched with the noise type among sound sources previously stored in a database, and plays and outputs the selected sound source.

20 Claims, 20 Drawing Sheets

(56) References Cited

U.S. PATENT DOCUMENTS

| | | |
|---|---|---|
| 2021/0407492 A1 | 12/2021 | Chang |
| 2022/0242309 A1* | 8/2022 | Kim .................. H04R 3/02 |
| 2022/0283773 A1 | 9/2022 | Chang et al. |
| 2022/0357912 A1 | 11/2022 | Kim et al. |
| 2023/0016272 A1 | 1/2023 | Kim et al. |

FOREIGN PATENT DOCUMENTS

| | | | |
|---|---|---|---|
| CN | 109524019 B * | 3/2025 | ......... B60R 11/0247 |
| KR | 10-2021-0158706 A | 12/2021 | |
| KR | 10-2022-0000655 A | 1/2022 | |
| KR | 10-2022-0123862 A | 9/2022 | |
| KR | 10-2022-0152829 A | 11/2022 | |
| KR | 10-2023-0012107 A | 1/2023 | |

* cited by examiner

SOUND SYSTEM FOR VEHICLE AND METHOD FOR IMPLEMENTING SOUND OF THE VEHICLE

CROSS-REFERENCE TO RELATED APPLICATION

This application claims under 35 U.S.C. § 119 (a) the benefit of Korean Patent Application No. 10-2023-0075609, filed in the Korean Intellectual Property Office on Jun. 13, 2023, the entire contents of which are incorporated herein by reference.

BACKGROUND

(a) Technical Field

The present disclosure relates to a sound system for a vehicle (e.g., a mobility) and a method for implementing a sound of the vehicle, more particularly, to the sound system and the method for implementing a soundscape which matches an environment around the vehicle.

(b) Description of the Related Art

A mobility vehicle (or "mobility") is a type of transportation, which may include an autonomous vehicle, a drone, a purpose built vehicle (PBV), and the like. It may be possible for the mobility to perform autonomous driving. The mobility may perform various functions depending on whether the interior space is used for a particular purpose while driving. A user who rides in the mobility may utilize a service provided in the mobility, such as education, healthcare, or entertainment. For example, the mobility may provide a sound based on an emotional state, body information, and/or the like of the user who rides in the mobility. Alternatively, the mobility may analyze an external image obtained by use of its camera while driving to determine a driving environment and may match and provide a sound suitable for the determined driving environment.

SUMMARY

An aspect of the present disclosure provides a sound system for a vehicle (e.g., a mobility) for receiving a recommendation of music that may match noise of a surrounding environment, or from among preferred music of a user who rides in the mobility. For example, the mobility may be a purpose built vehicle (PBV) such that the user may enjoy work or a hobby in the interior of the mobility without being influenced by environmental noise (e.g., road surface noise, construction noise, conversational noise, and/or the like) generated in the interior and exterior of the mobility, and the method may include implementing a soundscape.

Another aspect of the present disclosure provides a sound system for a mobility for selecting and playing music suitable for masking environmental noise generated around a mobility among pieces of music stored in a playlist of a user and a method for implementing a sound thereof.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a sound system for a vehicle (e.g., a mobility) may include a noise meter that measures environmental noise generated around the vehicle, a vibration meter that measures vibration generated by the vehicle, and a processor connected with the noise meter and the vibration meter. The processor may determine a noise type by analyzing features of the vibration and the environmental noise respectively measured by the vibration meter and the noise meter, may select a sound source matched with the noise type among sound sources previously stored in a database, and may play and output the selected sound source.

The processor may determine whether the vibration is greater than or equal to a predetermined reference level, may determine whether the vibration continues for at least a predetermined reference time in response to determining that the vibration is greater than or equal to the predetermined reference level, and may determine the noise type as road surface noise in response to determining that the vibration continues for at least the predetermined reference time.

The processor may analyze the environmental noise and extract a noise spectrum from the environmental noise and may analyze the noise spectrum using an artificial intelligence (AI) model and classify the noise type.

The processor may perform short-time fast Fourier transform (FFT) of the environmental noise to calculate the noise spectrum.

The noise spectrum may be implemented as at least one of a Mel-spectrum or a constant-Q power spectrum, or any combination thereof.

The AI model may be composed of at least one of a convolutional neural network (CNN) algorithm or a long short-term memory (LSTM) algorithm, or any combination thereof.

The processor may classify a noise type of the environmental noise as any one of impact noise, continuity noise, conversational noise, or other noise.

The processor may analyze beat intensity, a volume change slope, a voice coverage rate, and other noise suitability for each of the previously stored sound sources and stores the analyzed results in the database.

The processor may adjust volume of the selected sound source based on levels of the vibration and the environmental noise.

The noise meter may include a microphone that measures the environmental noise generated around the vehicle. The vibration meter may include a vibration accelerometer that measures vibration acceleration using a vibration sensor installed in a delivery path in which road surface noise is delivered in the vehicle.

A vehicle may include the above-described sound system.

According to another aspect of the present disclosure, a method for implementing a sound of a sound system for a vehicle (e.g., a mobility) may include measuring environmental noise generated around the vehicle using a noise meter included in the sound system for the vehicle, measuring vibration generated in the vehicle using a vibration meter included in the sound system for the vehicle, determining a noise type by analyzing features of the vibration and the environmental noise, selecting a sound source matched with the noise type among sound sources previously stored in a database included in the sound system for the vehicle, and playing and outputting the selected sound source.

The determining of the noise type may include determining whether the vibration is greater than or equal to a predetermined reference level, determining whether the vibration continues for at least a predetermined reference time in response to determining that the vibration is greater than or equal to the predetermined reference level, and determining the noise type as road surface noise in response to determining that the vibration continues for at least the predetermined reference time.

The determining of the noise type may include analyzing the environmental noise and extracting a noise spectrum from the environmental noise and analyzing the noise spectrum using an AI model and classifying the noise type.

The extracting of the noise spectrum may include performing short-time FFT of the environmental noise to calculate the noise spectrum.

The noise spectrum may be implemented as at least one of a Mel-spectrum or a constant-Q power spectrum, or any combination thereof.

The AI model may be composed of at least one of a CNN algorithm or an LSTM algorithm, or any combination thereof.

The extracting of the noise spectrum may include classifying a noise type of the environmental noise as any one of impact noise, continuity noise, conversational noise, or other noise.

The method may further include analyzing beat intensity, a volume change slope, a voice coverage rate, and other noise suitability for each of the previously stored sound sources and storing the analyzed results in the database.

The playing and outputting of the selected sound source may include adjusting volume of the selected sound source based on levels of the vibration and the environmental noise.

The measuring of the environmental noise may include measuring the environmental noise generated around the vehicle using a microphone. The measuring of the vibration may include measuring vibration acceleration using a vibration sensor installed in a delivery path in which road surface noise is delivered in the vehicle.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
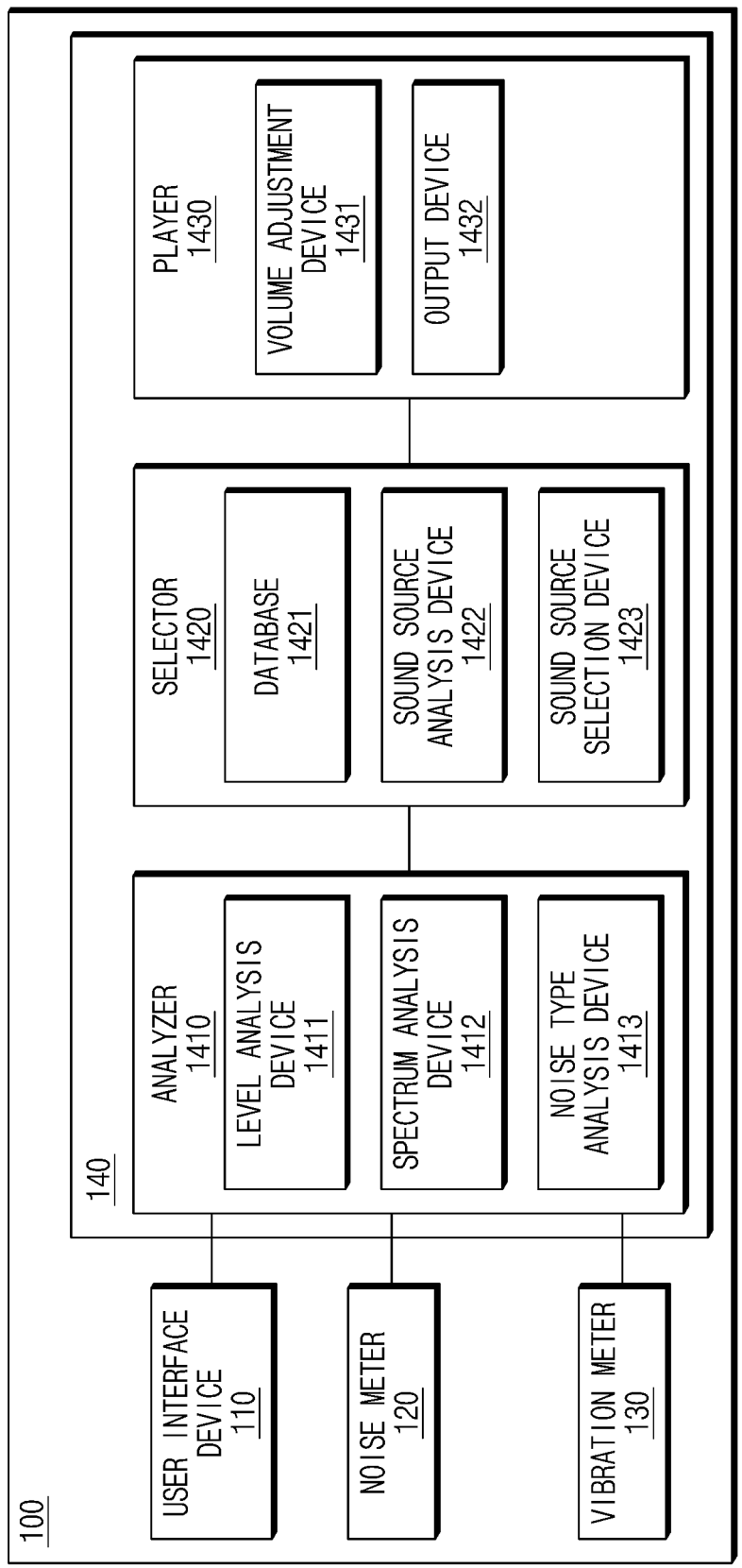
FIG. 1 is a block diagram illustrating a configuration of a sound system for a mobility according to embodiments of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Mobility devices or mobility vehicles such as bicycles and kickboards are typically used both as exercise equipment for daily sports and recreation, and also for short-distance transportation in urban areas. A mobility vehicle may include, for example, an electric kickboard, a delivery robot car, an electric bicycle, an electric wagon, an electric stroller, and other mobility devices/vehicles. The mobility may include a purpose built vehicle (PBV). As provided herein, the PBV may refer to a mobility manufactured for specific purposes such as public transport, a medical service, delivery, living, and a working space, including but not limited to a robotaxi, robomart, or the like.

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises" and/or "comprising." when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, some embodiments of the present disclosure will be described in detail with reference to the exemplary drawings. In the drawings, the same reference numerals will be used throughout to designate the same or equivalent elements. In addition, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are only used to distinguish one element from another element, but do not limit the corresponding elements irrespective of the order or priority of the corresponding elements. Furthermore, unless otherwise defined, all terms including technical and scientific terms used herein are to be interpreted as is customary in the art to which this invention belongs. It will be understood that terms used herein should be interpreted as having a meaning that is consistent with their meaning in the context of this disclosure and the relevant art and will not be interpreted in an idealized or overly formal sense unless expressly so defined herein.

FIG. 1 is a block diagram illustrating a configuration of a sound system for a mobility according to embodiments of the present disclosure.

A sound system 100 for a vehicle (e.g., a mobility) may be mounted on the mobility such as a purpose built vehicle (PBV). As provided herein, the PBV may refer to a mobility manufactured for specific purposes such as public transport, a medical service, delivery, living, and a working space, including but not limited to a robotaxi, robomart, or the like.

Referring to FIG. 1, a sound system 100 for the vehicle/mobility may include a user interface device 110, a noise meter 120, a vibration meter 130, and a processor 140.

The user interface device 110 may include a mode selection button for selecting a mode in which the sound system 100 for the mobility operates, that is, an operation mode. The operation mode may be divided into a recommended music mode, an autonomous sensory meridian response (ASMR) mode, and the like.

The user interface device 110 may be a device which helps the sound system 100 for the mobility and a user to interact with each other. The user interface device 110 may include an input device (e.g., a keyboard, a touch pad, a microphone, a touch screen, and/or the like) for generating data according to manipulation of the user, an output device (e.g., a display, a speaker, a tactile signal output device, and/or the like) for outputting information according to an operation of the sound system 100 for the mobility, and/or the like. Such a user interface device 110 may be implemented as an audio, video, navigation (AVN) terminal, an in-vehicle infotainment terminal, a telematics terminal, and/or the like.

The noise meter 120 may measure environmental noise (e.g., construction noise, traffic noise, conversational noise, and/or the like) generated around the mobility using a microphone. At least one or more microphones may be installed in the interior of the mobility.

The vibration meter 130 may measure vibration acceleration in a delivery path (e.g., a wheel housing panel part, a suspension frame, and/or the like) of the mobility, in which road surface noise is delivered to determine whether there is road surface noise (or vibration noise). The road surface noise may be generated while vibration generated by an impact due to a bump on the road surface while the mobility is driving spreads to interior air through tires, a suspension, a vehicle body, and the like. The vibration meter 130 may measure vibration acceleration using a vibration accelerometer. The vibration accelerometer may measure vibration acceleration using a vibration sensor installed on the delivery path of the mobility.

The processor 140 may control the overall operation of the sound system 100 for the mobility. The processor 140 may include at least one of an application specific integrated circuit (ASIC), a digital signal processor (DSP), programmable logic devices (PLD), field programmable gate arrays (FPGAs), a central processing unit (CPU), microcontrollers, or microprocessors, or any combination thereof. The processor 140 may include a memory in the inside and/or outside thereof. The memory may be a non-transitory storage medium which stores instructions executed by the processor 140, which may transmit and receive data with the processor 140 through various well-known processes. The memory may include at least one of a flash memory, a hard disk, a solid state disk (SSD), a secure digital (SD) card, a random access memory (RAM), a static RAM (SRAM), a read only memory (ROM), a programmable ROM (PROM), an electrically erasable and programmable ROM (EEPROM), or an erasable and programmable ROM (EPROM), or any combination thereof.

The processor 140 may be connected with the user interface device 110, the noise meter 120, and the vibration meter 130 over a network. The processor 140 may include an analyzer 1410, a selector 1420, and a player 1430. In other words, the analyzer 1410, the selector 1420, and the player 1430 may be executed by the processor 140.

The analyzer 1410 may analyze noise and vibration respectively measured by the noise meter 120 and the vibration meter 130 in real time. The analyzer 1410 may include a level analysis device 1411, a spectrum analysis device 1412, and a noise type analysis device 1413.

The level analysis device 1411 may determine whether a level of the vibration measured by the vibration meter 130 is greater than or equal to a predetermined reference value. The level analysis device 1411 may determine whether vibration of the reference value continues during a predetermined time (i.e., whether the vibration continues for a time period that is equal to or exceeds the predetermined time). When the level of the measured vibration is greater than or equal to the predetermined reference value and continues during the predetermined time, the level analysis device 1411 may determine that road surface noise (or vibration noise) is occurring. Meanwhile, when the level of the measured vibration is less than the predetermined reference value, or when the level of the measured vibration is greater than or equal to the predetermined reference value, but does not continue during the predetermined time, the level analysis device 1411 may determine that the road surface noise does not occur.

The level analysis device 1411 may analyze a level of the noise (or the environmental noise) measured by the noise meter 120. The level analysis device 1411 may repeatedly measure sound pressure of the environmental noise at a predetermined period during a predetermined time and may calculate an average (i.e., an average level [dBA]) of the measured sound pressure of the environmental noise.

The spectrum analysis device 1412 may analyze a time-frequency domain spectrum of the measured noise (i.e., the road surface noise and/or the environmental noise). The spectrum analysis device 1412 may perform a short-time fast Fourier transform (FFT) analysis of the measured noise signal. The spectrum analysis device 1412 may extract a noise spectrum of a time-frequency domain from the noise signal measured by using the short-time FFT analysis. The noise spectrum may be implemented as at least one of a Mel-spectrum or a constant-Q power spectrum, or any combination thereof. The extracted noise spectrum may be used input data of a deep learning model which will be described below.

The noise type analysis device 1413 may classify a type of currently generated noise. The type of the noise (or the noise type) may be divided (or classified) into road surface noise, impact noise, continuity noise, conversational noise, and other noise.

When it is determined by the level analysis device 1411 that the vibration which is greater than or equal to the predetermined reference value and continues during the predetermined time is generated, the noise type analysis device 1413 may determine the type of the currently generated noise as road surface noise. Furthermore, the noise type analysis device 1413 may classify the type of the measured environmental noise as any one of impact noise, continuity noise, conversational noise, or the other noise using a pre-trained deep learning model (or artificial intelligence (AI) model). The deep learning model may be composed of at least one of a convolutional neural network (CNN) model or a long short-term memory (LSTM) algorithm, or any combination thereof.

The selector 1420 may previously analyze and store features of sound sources a user prefers and may select a sound source based on the result of analyzing noise and/or vibration measured in real time. The selector 1420 may include a database 1421, a sound source analysis device 1422, and a sound source selection device 1423.

The database 1421 may store sound sources of music registered in a playlist. The sound source registered in the playlist may be a sound source of music the user prefers. The database 1421 may store feature information of each of sound sources together. The feature information of the sound source may include at least one of beat intensity, a main frequency band, an envelope accumulation slope, a voice coverage rate, or other noise suitability, or any combination thereof.

The sound source analysis device 1422 may previously analyze a feature of each of the sound sources stored in the database 1421. In other words, when a new sound source is stored in the database 1421, the sound source analysis device 1422 may analyze a feature of the sound source. The sound source analysis device 1422 may store the result of analyzing the feature of the sound source in the database 1421, The sound source selection device 1423 may match the previously analyzed feature of the sound source and feature(s) of vibration and/or noise measured and analyzed in real time and may select a sound source suitable for noise masking. In other words, the sound source selection device 1423 may select music which is most suitable for the noise type and the noise/vibration spectrum measured in real time, using the result of analyzing the feature of each of the sound sources previously stored in the database 1421.

The sound source selection device 1423 may analyze features (e.g., a vibration level, a noise level, and a noise type) of the measured vibration and noise, may compare the analyzed result with features of the sound sources stored in the database 1421, and may select a sound source (or a masking sound source) which is most suitable for masking currently measured noise (or current noise). For example, when the type of the currently measured noise is road surface noise, the sound source selection device 1423 may select dance music with a strong beat and a reinforced mid-low sound as the masking sound source. When the type of the currently measured noise is impact noise, the sound source selection device 1423 may select dance music with a strong beat and a reinforced mid-high sound as the masking sound source. When the type of the currently measured noise is continuity noise, the sound source selection device 1423 may select classical music (e.g., Autumn from Vivaldi's 'The Four Seasons'), which is strong and is softly connected, as the masking sound source. When the type of the currently measured noise is conversational noise, the sound source selection device 1423 may select rap music, which is powerful and has high lyrics delivery, as the masking sound source. When the type of the currently measured noise is other noise, the sound source selection device 1423 may select music, which has a strong beat, is soft, and has enough lyrics, as the masking sound source.

The player 1430 may play and output the sound source selected by the sound source selection device 1423. The player 1430 may adjust volume of the selected sound source. The player 1430 may include a volume adjustment device 1431 and an output device 1432.

The volume adjustment device 1431 may automatically adjust volume of the selected sound source to be suitable for masking based on the volume of the measured noise (i.e., volume of vibration noise and/or environmental noise). The volume adjustment device 1431 may adjust the volume of the sound source using a predetermined volume calculation formula in a predetermined volume adjustment condition.

The output device 1432 may play and output the sound source, the volume of which is adjusted by the volume adjustment device 1431. The output device 1432 may output the played sound source through an amplifier, a speaker, and the like. The amplifier may amplify an electrical signal of the sound of the sound source played by the output device 1432. A plurality of speakers may be installed at different locations in the inside and/or outside of the mobility. The speaker may convert the electrical signal amplified by the amplifier into a sound wave.

Figure 2:
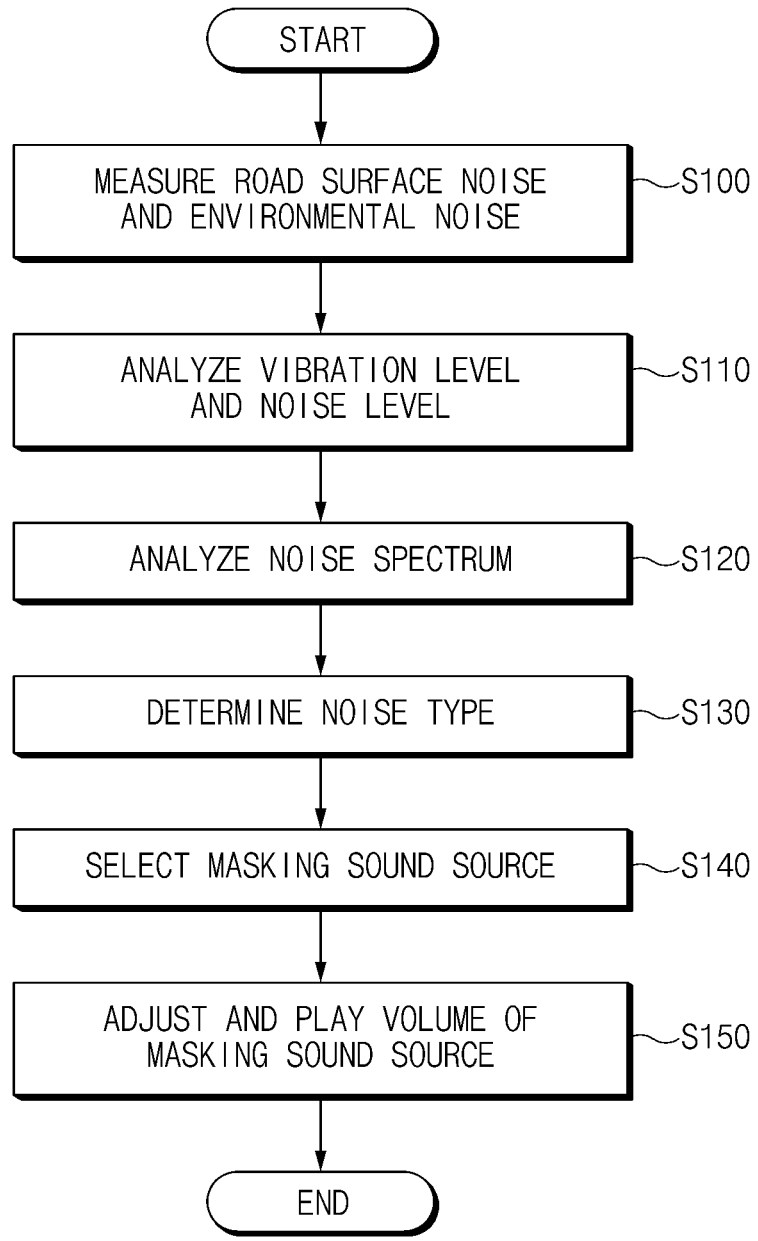
FIG. 2 is a flowchart illustrating a method for implementing a sound of a sound system for the mobility according to embodiments of the present disclosure.

FIG. 2 is a flowchart illustrating a method for implementing a sound of a sound system for the mobility according to embodiments of the present disclosure.

In S100, a processor 140 of a sound system 100 for the mobility in FIG. 1 may measure road surface vibration (or road surface noise) and environmental noise. The processor 140 may measure noise generated around a mobility using a noise meter 120 and a vibration meter 130 of FIG. 1. The processor 140 may measure environmental noise (e.g., construction noise, traffic noise, and/or conversational noise) by use of the noise meter 120. Furthermore, the processor 140 may measure vibration (or vibration noise) generated by an impact due to a bump on a road surface by the vibration meter 130.

In S110, the processor 140 may analyze a level of the measured road surface vibration (or a vibration level) and a level of the measured environmental noise (or a noise level). The processor 140 may determine whether the measured vibration level is greater than or equal to a predetermined reference value (or reference level) and is maintained for at least a predetermined reference time. Furthermore, the processor 140 may calculate levels of environmental noise measured during a predetermined time to calculate an average level.

In S120, the processor 140 may analyze a noise spectrum of the measured noise. The processor 140 may perform a short-time FFT analysis of a signal (or a measured noise signal) in which current noise (e.g., environmental noise) is measured. The processor 140 may extract a noise spectrum in a time-frequency domain from the noise signal measured by the short-time FFT analysis.

In S130, the processor 140 may determine a noise type by the noise spectrum analysis. When it is determined (or analyzed) that the measured vibration level is greater than or equal to the predetermined reference value and is maintained for at least the predetermined reference time, the processor 140 may determine the noise type as road surface noise. The processor 140 may input the extracted noise spectrum to a deep learning model (or an AI model). The deep learning model may analyze the received noise spectrum and may output a noise type as the analyzed result. In other words, the processor 140 may analyze the extracted noise spectrum using the deep learning model and may determine the noise type as any one of impact noise, continuity noise, conversational noise, or other noise.

In S140, the processor 140 may select a masking sound source based on the determined noise type. The processor 140 may select at least one sound source matched with the determined noise type among sound sources stored in a database 1421 of FIG. 1. At this time, the processor 140 may select a sound source suitable for noise masking based on feature information of each of the sound sources stored in the database 1421.

In S150, the processor 140 may adjust and play volume of the masking sound source based on the noise level. The processor 140 may output the played sound source through an amplifier and a speaker.

Figure 3:
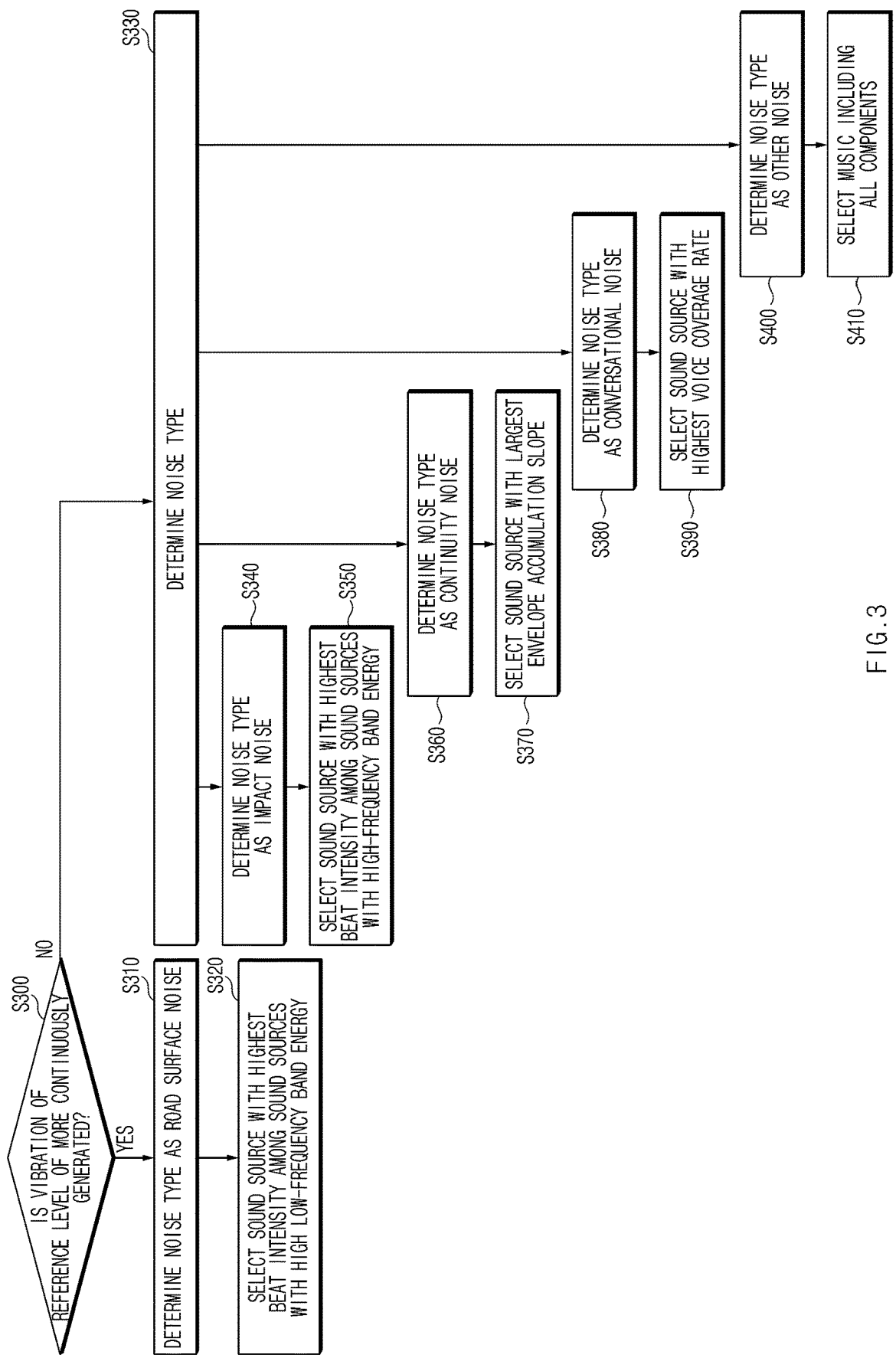
FIG. 3 is a flowchart illustrating a method for selecting a sound source according to embodiments of the present disclosure.

FIG. 3 is a flowchart illustrating a method for selecting a sound source according to embodiments of the present disclosure.

In S300, a processor 140 of a sound system 100 for the mobility in FIG. 1 may determine whether vibration measured by a vibration meter 130 of FIG. 1 is greater than or equal to a predetermined reference level (or reference value) and is continuously generated during a predetermined reference time.

When it is determined that the measured vibration is greater than or equal to the reference level and is continuously generated during the reference time, in S310, the processor 140 may determine a noise type as road surface noise.

When it is determined that the noise type is the road surface noise, in S320, the processor 140 may select a sound source with the highest beat intensity among sound sources with high low-frequency band energy.

When it is determined that the measured vibration is not greater than or equal to the reference level and is not continuously generated during the reference time, in S330, the processor 140 may determine a noise type. In other words, when the measured vibration is less than the reference level or when the measured vibration is greater than or equal to the reference level or is not continuously generated during the reference time, the processor 140 may determine a noise type of environmental noise.

When it is determined that the noise type is impact noise in S340, in S350, the processor 140 may select a sound source with the highest beat intensity among sound sources with high high-frequency band energy.

When it is determined that the noise type is continuity noise in S360, in S370, the processor 140 may select a sound source with the largest envelope accumulation slope.

When it is determined that the noise type is conversational noise in S380, in S390, the processor 140 may select a sound source with the highest voice coverage rate.

When it is determined that the noise type is other noise in S400, in S410, the processor 140 may select music which uniformly includes all components.

Thereafter, the processor 140 may automatically adjust volume of the selected sound source to volume suitable for noise masking with regard to a magnitude of ambient noise (i.e., road surface noise or environmental noise) and may play the selected sound source.

FIGS. 4A to 4D are graphs illustrating levels of road surface noise and a masking sound source according to embodiments of the present disclosure.

To evaluation the effect of masking road surface noise of a sound source selected by a sound system 100 for the mobility in FIG. 1, a sound source (i.e., a masking sound source) suitable for masking road surface noise measured using the sound system 100 for the mobility may be selected. A level (e.g., a root mean square (RMS) level) of the selected sound source may be adjusted to a predetermined interval compared to a noise source (or a road surface noise level) to evaluate the effect of masking road surface noise of the selected sound source by hearing evaluation of a user.

Figure 4A:
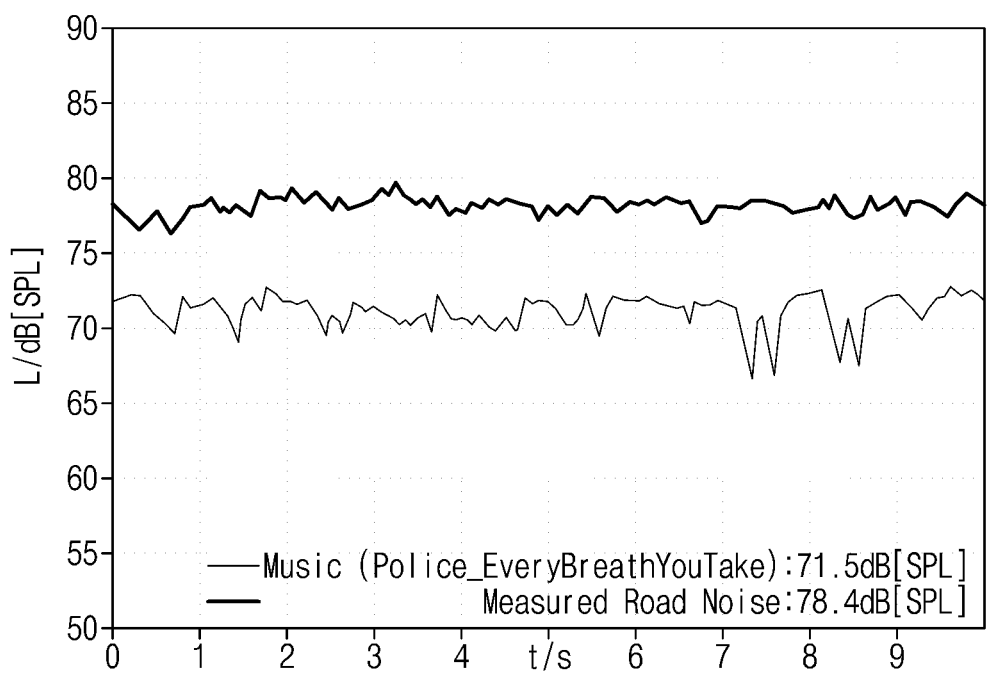
FIGS. 4A, 4B, 4C, and 4D are graphs illustrating levels of road surface noise and a masking sound source according to embodiments of the present disclosure.

As shown in FIG. 4A, the level of a masking sound source is adjusted to −7 dB compared to the noise source and hearing evaluation of the user is executed while the masking sound source is played. Referring to Table 1 below, when the level of the masking sound source is adjusted to −7 dB compared to the noise source, it may be seen that there is no masking effect as the result of executing the hearing evaluation of the user is an average of 2 points.

Figure 4B:

As shown in FIG. 4B, the level of a masking sound source is adjusted to −2 dB compared to the noise source and hearing evaluation of the user is executed while the masking sound source is played. Referring to Table 1 below, when the level of the masking sound source is adjusted to −2 dB compared to the noise source, it may be seen that there is a weak masking effect as the result of executing the hearing evaluation of the user is an average of 4 points.

Figure 4C:
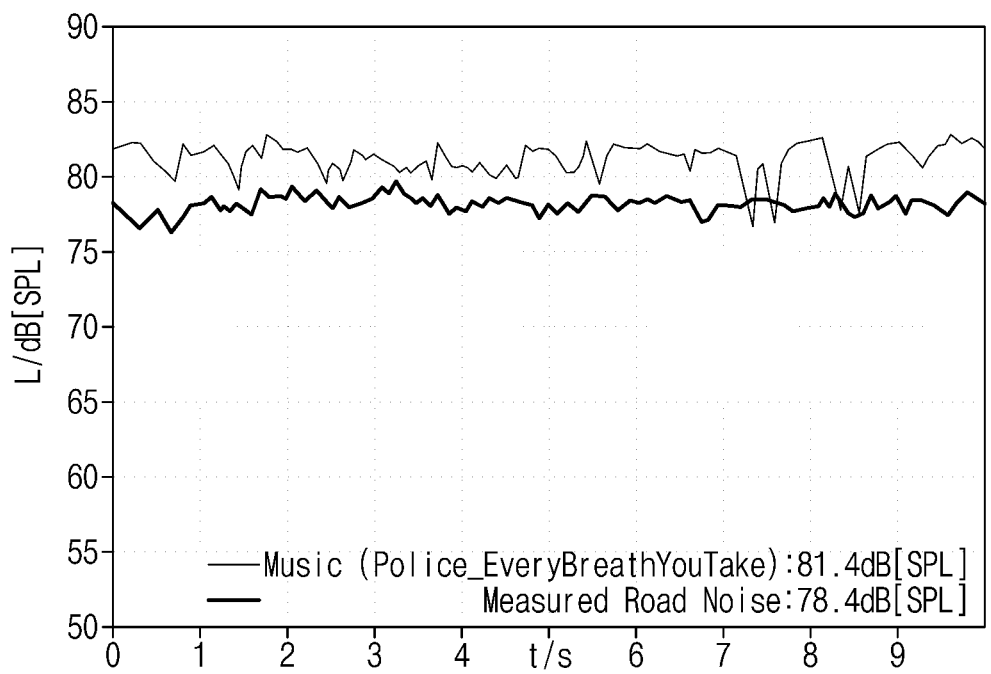

As shown in FIG. 4C, the level of a masking sound source is adjusted to +3 dB compared to the noise source and hearing evaluation of the user is executed while the masking sound source is played. Referring to Table 1 below, when the level of the masking sound source is adjusted to +3 dB compared to the noise source, it may be seen that there is a masking effect as the result of performing the hearing evaluation of the user is an average of 9 points.

Figure 4D:
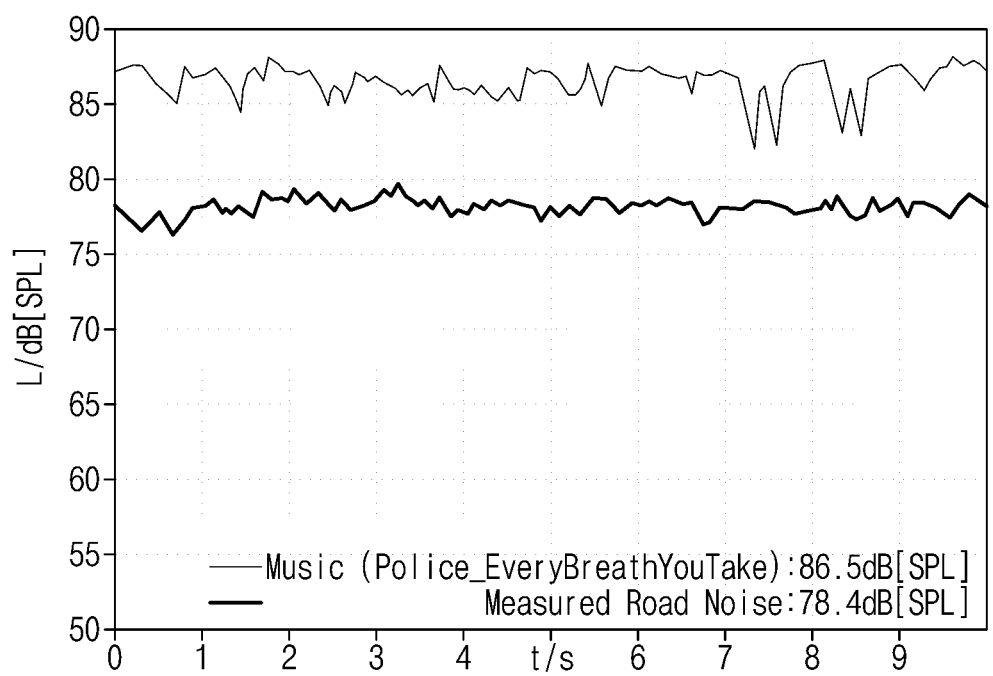

As shown in FIG. 4D, the level of a masking sound source is adjusted to +8 dB compared to the noise source and hearing evaluation of the user is executed while the masking sound source is played. Referring to Table 1 below, when the level of the masking sound source is adjusted to +8 dB compared to the noise source, it may be seen that there is a masking effect as the result of executing the hearing evaluation of the user is an average of 7 points, but the user may feel burdened as the overall volume of the masking sound source is too high.

TABLE 1

| NO. | Road surface noise level | Masking sound source level | Sound source level difference compared to noise source | Result of executing hearing evaluation of user (average of 10 people, out of 10) | Notes |
|---|---|---|---|---|---|
| 1 | 78.4 dB | 71.5 dB | −7 dB | 2 points | No masking effect |
| 2 | 78.4 dB | 76.5 dB | −2 dB | 4 points | Weak masking effect |
| 3 | 78.4 dB | 81.4 dB | +3 dB | 9 points | Good masking effect |
| 4 | 78.4 dB | 86.5 dB | +8 dB | 7 points | Good masking effect, but too high entire volume |

As described above, when the level of the masking sound source is adjusted to +3 dB compared to the noise source, it may be derived in advance that the masking effect is good through an experiment.

Figure 5:
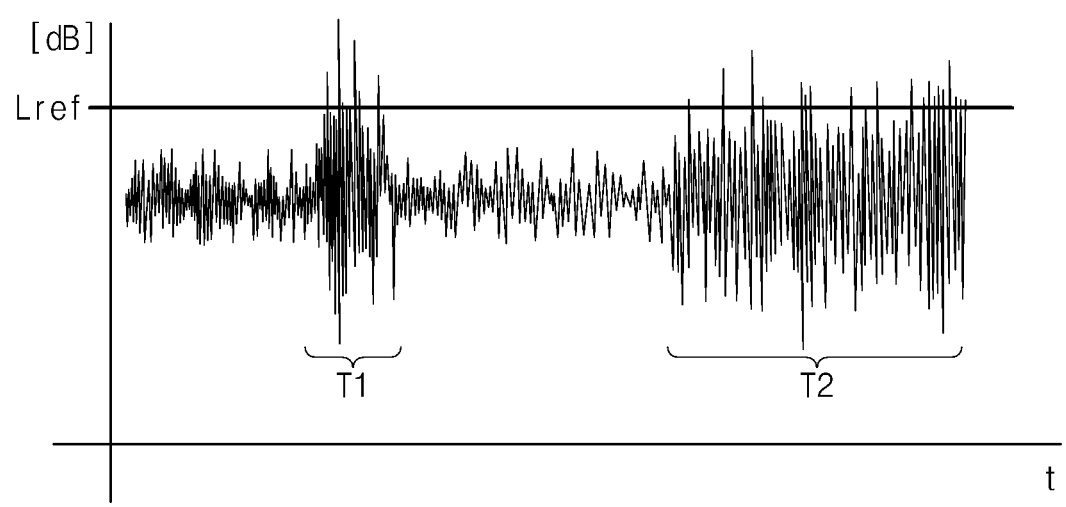
FIG. 5 is a drawing for describing a method for analyzing a vibration level according to embodiments of the present disclosure.

FIG. 5 is a drawing for describing a method for analyzing a vibration level according to embodiments of the present disclosure.

Referring to FIG. 5, a level analysis device 1411 of a sound system 100 for the mobility in FIG. 1 may determine whether the level of vibration of a mobility, which is generated due to a bump on the road surface while the mobility is driving, is greater than or equal to a predetermined reference level $L_{ref}$ and the vibration continues for at least a predetermined reference time. For example, the level analysis device 1411 may determine whether a time (or a vibration duration) T1 or T2 when the vibration of the reference level $L_{ref}$ is maintained (or continues) is greater than or equal to the predetermined reference time. When it is determined that the vibration duration T1 is less than the predetermined reference time, the level analysis device 1411 may determine that the current noise is not road surface noise. Meanwhile, when it is determined that the vibration duration T1 is greater than or equal to the predetermined reference time, the level analysis device 1411 may determine that the current noise is the road surface noise.

The level analysis device 1411 may determine whether the current noise is the road surface noise based on a determination condition using a logic function. Herein, the determination condition may be represented as Equation 1 below.

$$\{IF(Level_{m1} > Level_s + 6, 1, 0) +$$
$$IF(Level_{m2} > Level_s + 6, 1, 0) +$$
$$IF(Level_{m3} > Level_s + 6, 1, 0) + IF(Level_{m4} > Level_s +$$
$$6, 1, 0) + IF(Level_{m5} > Level_s + 6, 1, 0)\} \geq 3$$

[Equation 1]

Herein, $Level_{m1}$ is the rms level of the vibration measured at the interval of 0 second to 1 second, $Level_{m2}$ is the rms level of the vibration measured at the interval of 1 second to 2 seconds, $Level_{m3}$ is the rms level of the vibration measured at the interval of 2 seconds to 3 seconds, $Level_{m4}$ is the rms level of the vibration measured at the interval of 3 seconds to 4 seconds, $Level_{m5}$ is the rms level of the vibration measured at the interval of 4 seconds to 5 seconds, and Levels is the rms level of the vibration measured in advance on the smooth road surface to be used as the reference value.

The level analysis device 1411 may measure an average vibration level (or a rms level of vibration) a predetermined number of times (5 times) during a predetermined time (e.g., 5 seconds) and may determine whether the case where the measured average vibration level is greater than a predetermined rate (200%) compared to a reference average vibration level occurs greater than or equal to a predetermined number of times (e.g., 3 times).

The level analysis device 1411 may repeatedly measure sound pressure of environmental noise during a predetermined time and may calculate an average level [dBA] of the environmental noise. For example, the level analysis device 1411 may measure sound pressure of the environmental noise during 1 second and may average the measured sound pressure to calculate an average level.

Figure 6:
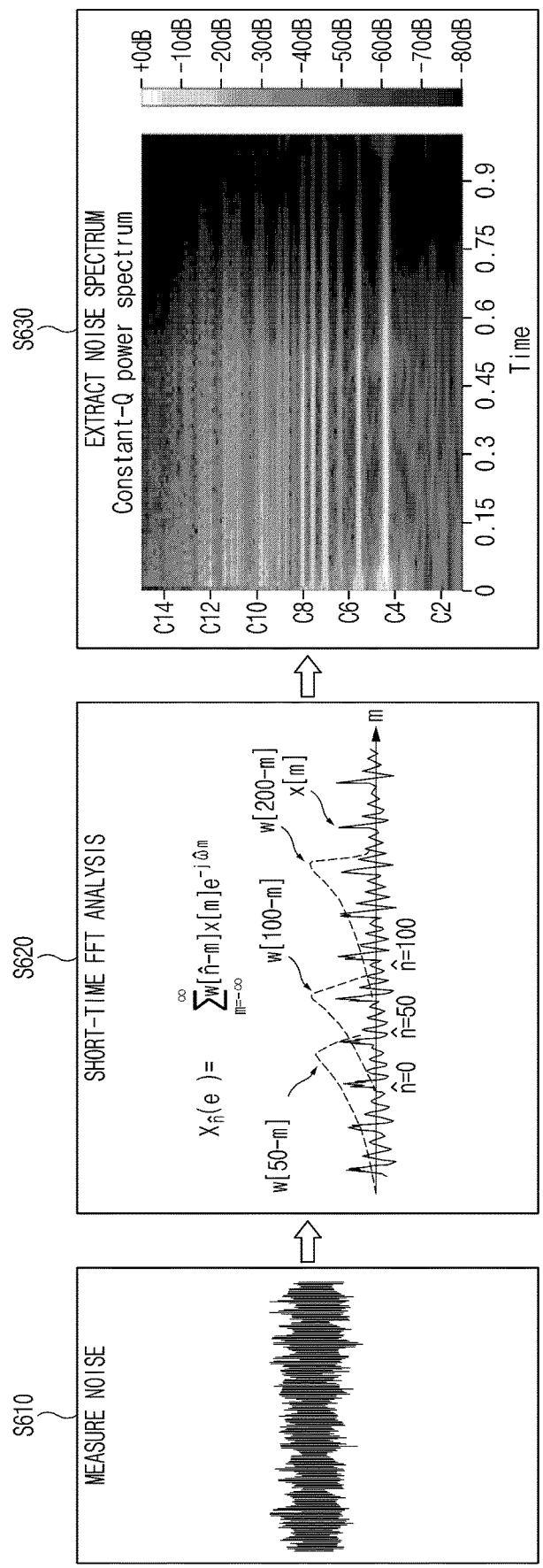
FIG. 6 is a drawing for describing a process of analyzing a noise spectrum according to embodiments of the present disclosure.

FIG. 6 is a drawing for describing a process of analyzing a noise spectrum according to embodiments of the present disclosure.

In S610, a spectrum analysis device 1412 of FIG. 1 may receive a noise signal measured by a noise meter 120 of FIG. 1.

In S620, the spectrum analysis device 1412 may perform a short-time FFT analysis of the received noise signal. The short-time FFT refers to dividing a signal into short time intervals and performing FFT while overlapping each of the short time intervals.

In S630, the spectrum analysis device 1412 may extract a noise spectrum from the result of performing the short-time FFT. The noise spectrum may be a Mel-spectrum, a constant-Q power spectrum, or the like having a structure advantageous for classifying a specific value in a deep learning model.

Figure 7:
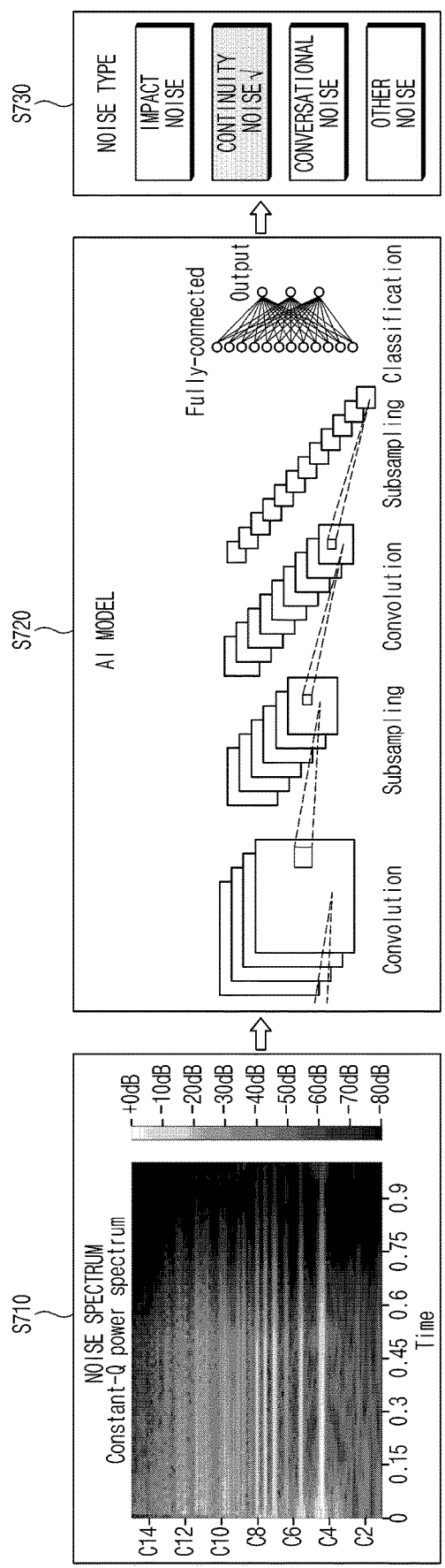
FIG. 7 is a drawing for describing a process of determining a noise type according to embodiments of the present disclosure.

FIG. 7 is a drawing for describing a process of determining a noise type according to embodiments of the present disclosure.

In S710, a noise type analysis device 1413 of FIG. 1 may receive a noise spectrum output from a spectrum analysis device 1412 of FIG. 1.

In S720, the noise type analysis device 1413 may input the received noise spectrum to an AI model (or an AI algorithm) and may classify a noise type. The AI model is a deep learning model for preparing a spectrum of various pieces of noise as data for map learning in advance and predicting a noise type generated by learning the data for map learning. The AI model may be implemented as a CNN algorithm, an LSTM algorithm, or the like. When using the CNN algorithm as the AI model, the noise type analysis device 1413 may input a two-dimensional (2D) image of the noise spectrum to the CNN algorithm and may classify a noise type. When using the LSTM algorithm as the AI model, the noise type analysis device 1413 may extract serial data on a frequency axis in units of a predetermined time from the noise spectrum and may input the extracted data to the LSTM algorithm to classify a noise type. The noise type may be divided into impact noise, continuity noise, conversational noise, and other noise.

In S730, the noise type analysis device 1413 may output the noise type classified by the AI model.

Hereinafter, a description will be given of a method for analyzing a sound source in a sound source analysis device 1422 of FIG. 1.

Figure 8A:
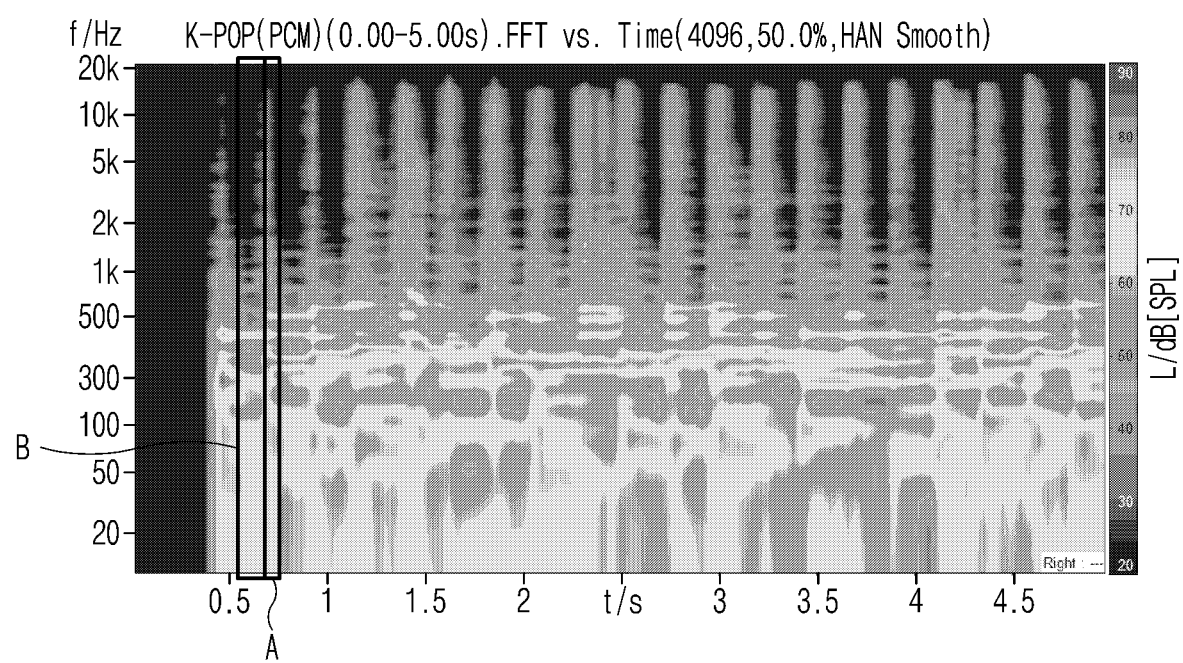
FIGS. 8A and 8B are drawings for describing a method for detecting a beat period of a sound source according to embodiments of the present disclosure.
Figure 8B:
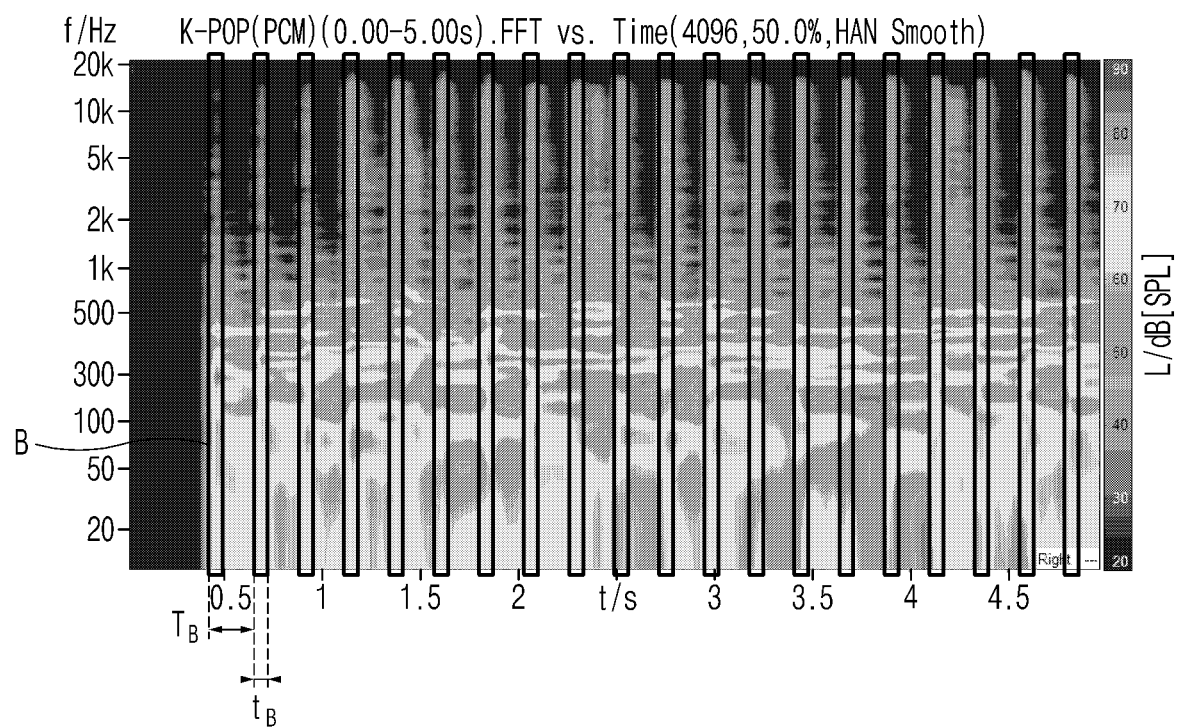
Figure 9:
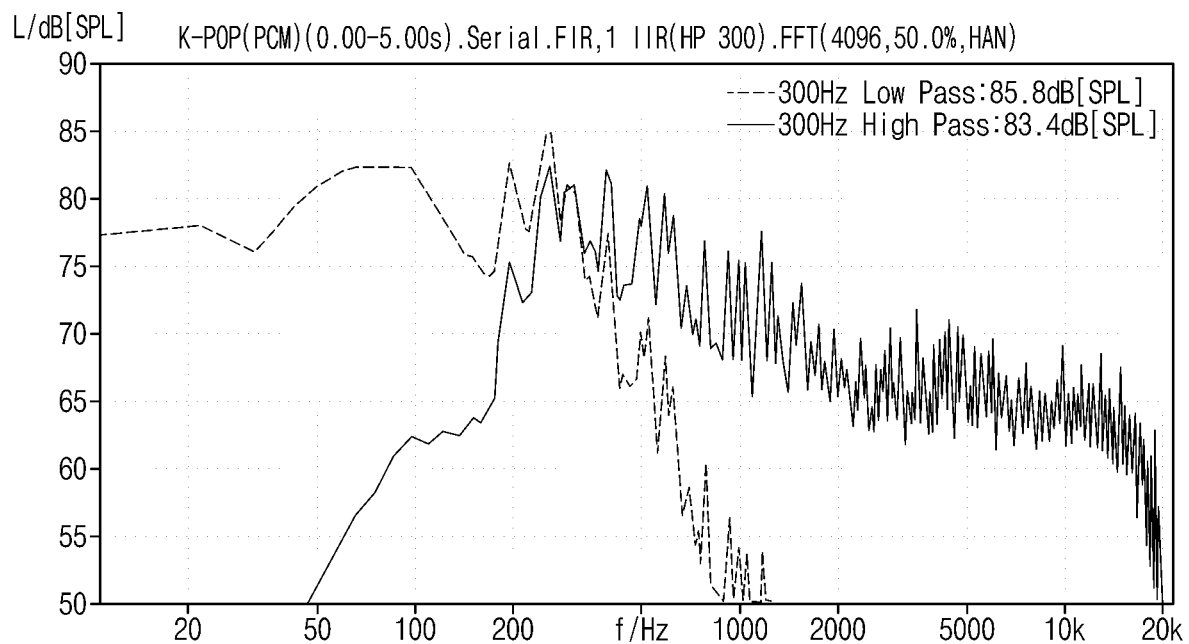
FIG. 9 is a drawing for describing a method for determining a main frequency band according to embodiments of the present disclosure.

First of all, a description will be given of a process of analyzing beat intensity of a sound source in the sound source analysis device 1422 with reference to FIGS. 8A to 9. FIGS. 8A and 8B are drawings for describing a method for detecting a beat period of a sound source according to embodiments of the present disclosure. FIG. 9 is a drawing for describing a method for determining a main frequency band according to embodiments of the present disclosure.

A sound source analysis device 1422 of FIG. 1 may previously analyze features of sound sources stored in a database 1421 of FIG. 1 and may store the analyzed results in the database 1421. The sound sources stored in the database 1421 may be composed of pieces of user preference music registered in a playlist. Because the results of analyzing the features of the sound sources as well as the sound sources are stored together in the database 1421, a sound system 100 for the mobility in FIG. 1 may access and quickly execute the result stored in the database 1421 when operated in real time.

The sound source analysis device 1422 may analyze beat intensity of the sound source and may output the beat intensity and the main frequency band. The sound source analysis device 1422 may analyze beat intensity of the sound source using subjective hearing evaluation, an AI model, or a signal processing analysis method.

The sound source analysis device 1422 may determine whether a repeated beat is continuously generated and whether intensity of the generated beat is sufficiently strong to select music with a strong beat, for example, dance music, and mask environmental noise classified as impact noise. Furthermore, the sound source analysis device 1422 may determine whether there is a low-frequency band-oriented sound source suitable for masking road surface noise.

The sound source analysis device 1422 may configure a spectrum in a time (x-axis)-frequency (y-axis) domain as shown in FIG. 8A using short-time FFT for the sound sources stored in the database 1421 in turn and may determine whether there is a component repeated at intervals of a certain time. The sound source analysis device 1422 may identify whether energy occurs throughout the entire frequency band and may divide the entire frequency band into a beat generation interval A and a beat non-generation interval B. Furthermore, the sound source analysis device 1422 may find a period $T_B$ when a beat is generated and a beat generation time $t_B$ as shown in FIG. 8B. In other words, the sound source analysis device 1422 may detect a beat period.

When the beat generation interval A and the beat non-generation interval B are divided, the sound source analysis device 1422 may calculate beat intensity BI using Equation 2 below.

$$BI = SPL_A - SPL_B \quad \text{[Equation 2]}$$

Herein, $SPL_A$ is the RMS sound pressure level dB where all of beat generation intervals are averaged, and $SPL_B$ is the RMS sound pressure level dB where all of beat non-generation intervals are averaged.

When the beat generation interval A and the beat non-generation interval B are not well divided in a specific frequency band, the sound source analysis device 1422 may filter the frequency band and may calculate the beat intensity BI using Equation 2 above. For example, when it is determined that the sense of division of the beats is small in a frequency band of 500 Hz or less, the sound source analysis device 1422 may apply a high pass filter to filter a frequency band of 500 Hz or more and may calculate an RMS sound pressure level for each interval. When RMS sound pressure $SPL_B$ is 80 dB in the beat non-generation interval and when RMS sound pressure $SPL_A$ is 88 dB in the beat generation interval, the sound source analysis device 1422 may calculate beat intensity BI of 8 dB using Equation 2 above.

When the division of the beat generation interval A and the beat non-generation interval B is very small as a result of the analysis, the sound source analysis device 1422 may determine the sound source as a beat non-generation sound source and may skip a beat intensity analysis stage.

The sound source analysis device 1422 may determine a main frequency band of the sound source to be used to mask road surface noise when energy of the sound source is concentrated at a low frequency and to be used to mask impact noise when the energy of the sound source is concentrated at a high frequency.

The sound source analysis device 1422 may perform filtering using a low pass filter or a high pass filter to divide the frequency band. The sound source analysis device 1422 may perform FFT of the divided frequency band to calculate an RMS level. At this time, an upper limit $f_{Limit}$ (e.g., 300 Hz) of a problem frequency band of road surface noise may be used as a cut-off frequency of each of the low pass filter and the high pass filter.

The sound source analysis device 1422 may determine whether the sound source is concentrated in a low frequency band suitable of masking road surface noise or is concentrated in a high frequency band suitable for masking impact noise using Equation 3 below. The sound source analysis device 1422 may classify the sound source as a sound source for low frequency, when the sound source meets Equation 3 below, and may classify the sound source as a sound source for high frequency, when the sound source does not meet Equation 3 below.

$$\text{RMS}\{LP \text{ Filter } (f_{Limit}) + FFT(\text{sound source})\} > \quad \text{[Equation 3]}$$
$$\text{RMS}\{HP \text{ Filter } (f_{Limit}) + FFT(\text{sound source})\} + C1(\text{dB})$$

Herein, C1 is a constant, which may be randomly by a system developer in advance. Because the higher C1, the more the low frequency component should increase, there may be a high possibility that the sound source will be classified as a sound source for high frequency. A value between 0 and 10 may be used as C1.

As shown in FIG. 9, the sound source analysis device 1422 may apply each of a low pass filter and a high pass filter to a sound source during 5 seconds in an early portion of specific music to perform FFT and may calculate an RMS sound pressure level. The sound source analysis device 1422 may apply the low pass filter to filter a frequency band of 0 Hz to 300 Hz and perform FFT and may calculate an RMS sound pressure level to calculate 85.8 dB. The sound source analysis device 1422 may apply the high pass filter to filter a frequency band of 300 Hz or more and perform FFT and may calculate an RMS sound pressure level to obtain 83.4 dB. The sound source analysis device 1422 may apply the calculated RMS sound pressure levels to Equation 3 above to determine whether the calculated RMS sound pressure levels meet Equation 3 above. When it is determined that the calculated RMS sound pressure levels do not meet Equation 3 above as 85.8>83.4+5, the sound source analysis device 1422 may classify the music as a sound source for high frequency.

Figure 10A:
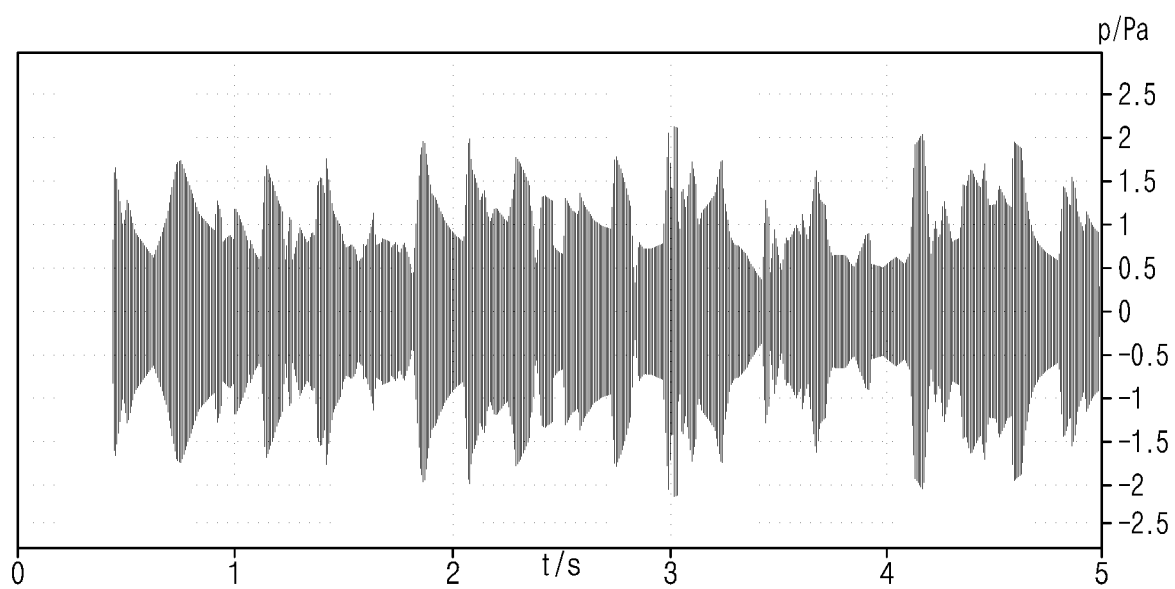
FIG. 10A is a graph illustrating an example of a change in volume of a sound source according to embodiments of the present disclosure.
Figure 10B:
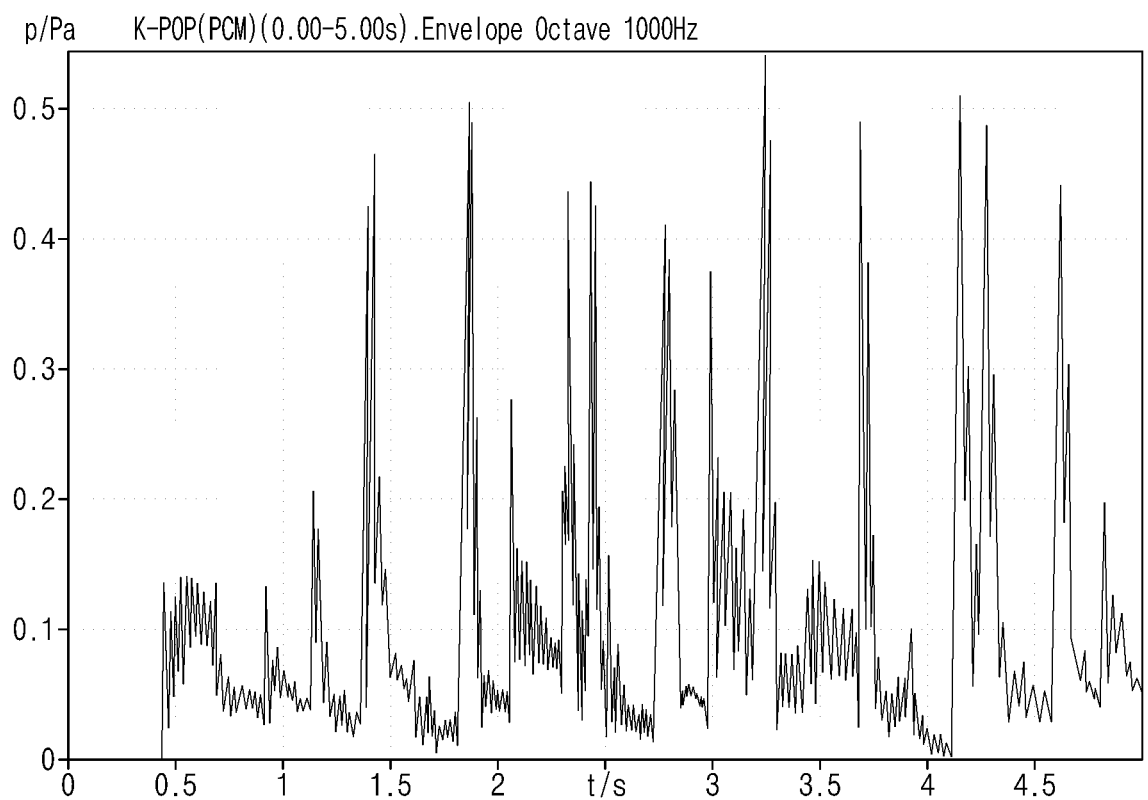
FIG. 10B is a graph illustrating an envelope accumulation slope according to a change in volume shown in FIG. 10A.
Figure 11A:
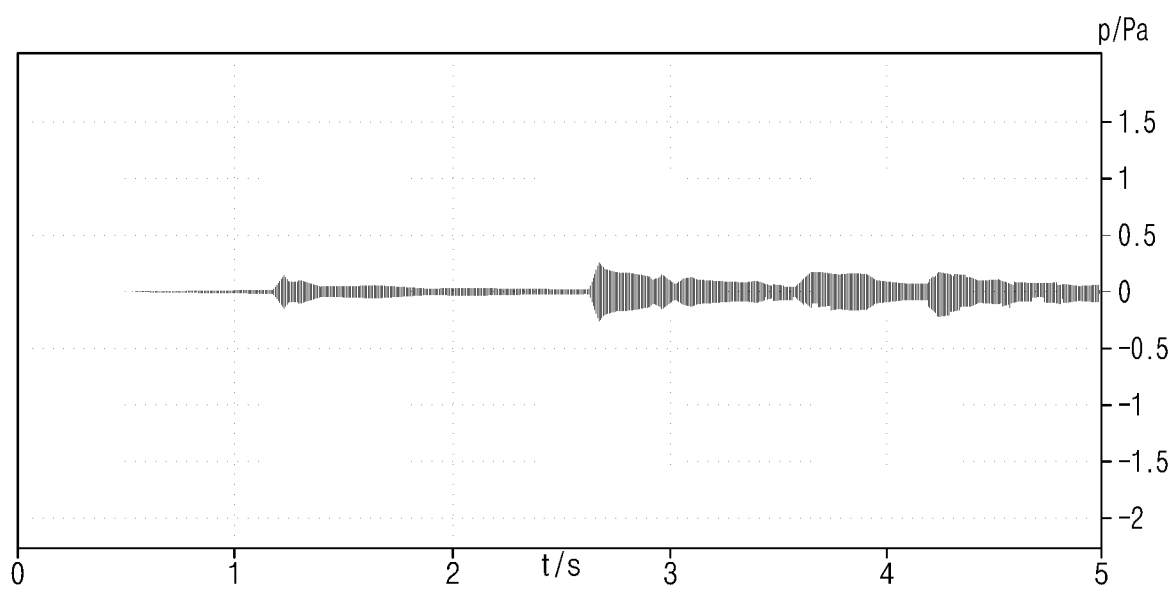
FIG. 11A is a graph illustrating another example of a change in volume of a sound source according to embodiments of the present disclosure.
Figure 11B:
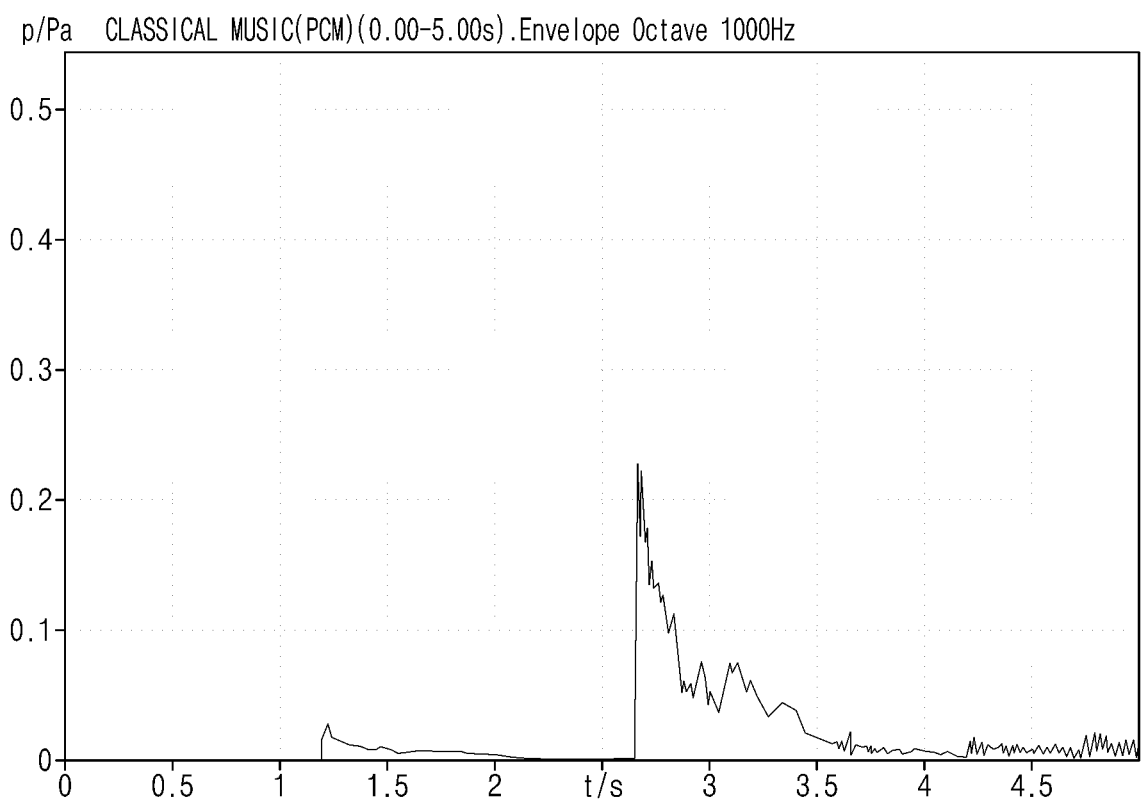
FIG. 11B is a graph illustrating an envelope accumulation slope according to a change in volume shown in FIG. 11A.
Figure 12A:
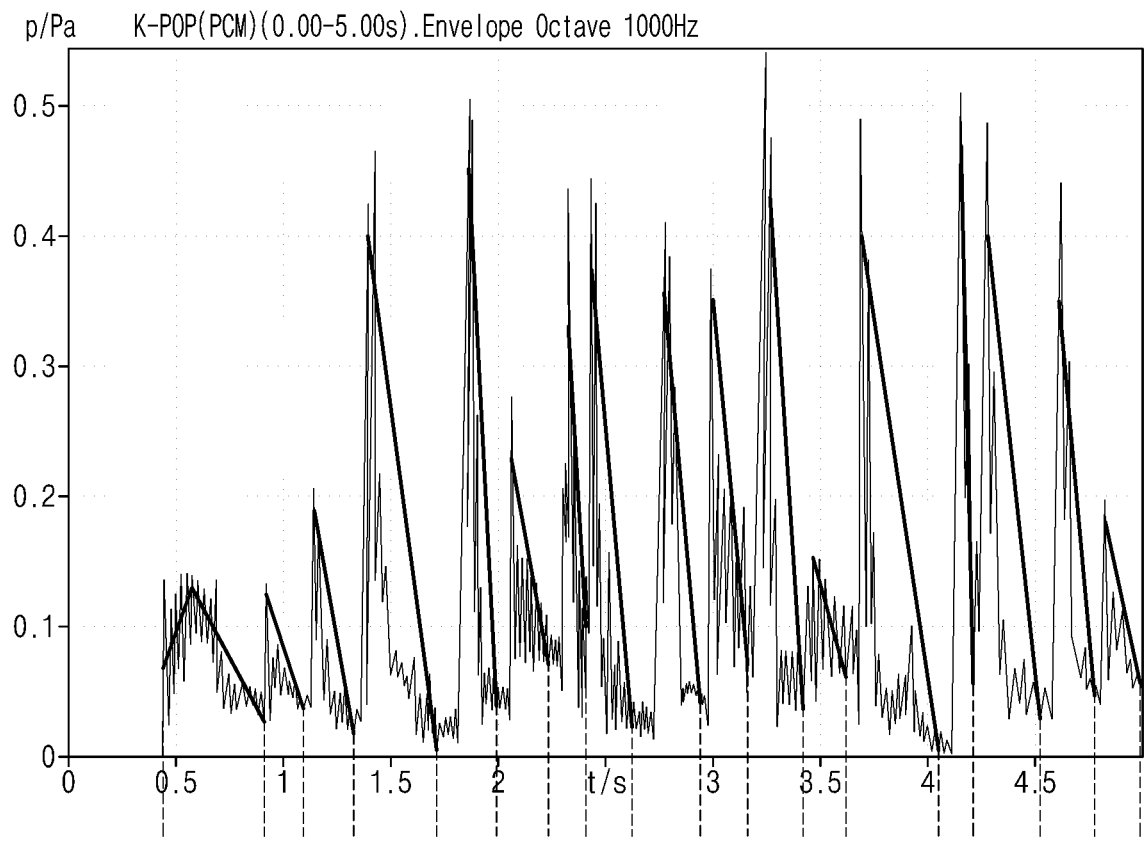
FIGS. 12A and 12B are drawings illustrating an example of curve fitting according to embodiments of the present disclosure.
Figure 12B:
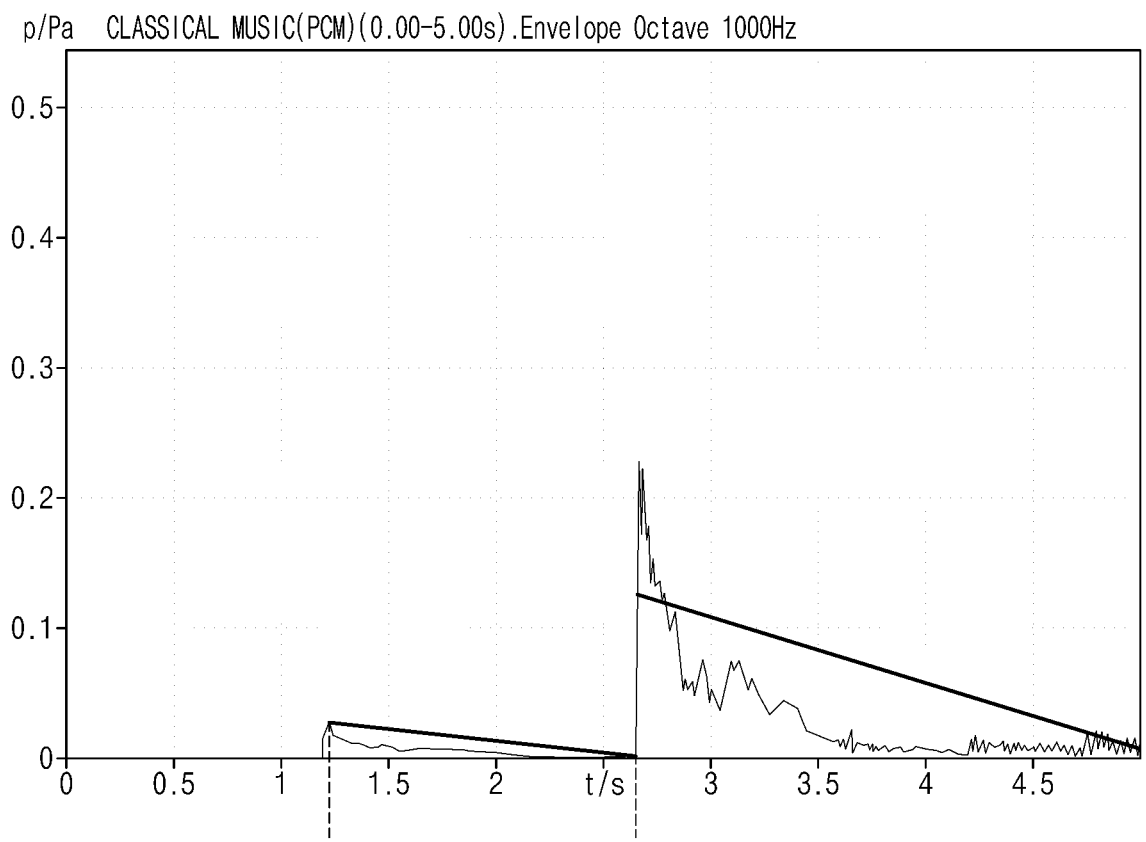
Figure 13:
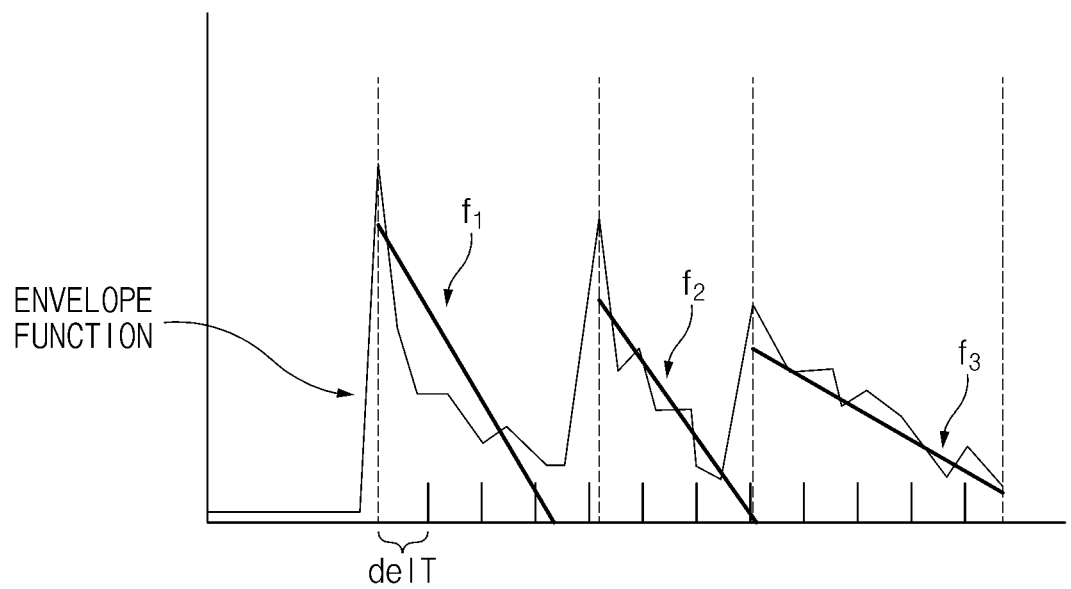
FIG. 13 is a drawing illustrating a curve fitting result according to embodiments of the present disclosure.

Next, a description will be given of a process of analyzing a change slope of a sound source in the sound source analysis device 1422 with reference to FIGS. 10A to 13. FIG. 10A is a graph illustrating an example of a change in volume of a sound source according to embodiments of the present disclosure. FIG. 10B is a graph illustrating an envelope accumulation slope according to a change in volume shown in FIG. 10A. FIG. 11A is a graph illustrating another example of a change in volume of a sound source according to embodiments of the present disclosure. FIG. 11B is a graph illustrating an envelope accumulation slope according to a change in volume shown in FIG. 11A. FIGS. 12A and 12B are drawings illustrating an example of curve fitting according to embodiments of the present disclosure. FIG. 13 is a drawing illustrating a curve fitting result according to embodiments of the present disclosure.

A sound source analysis device 1422 of FIG. 1 may select a smoothly changed sound such as classical or light music and may analyze a change slope of the sound source to mask environmental noise classified as continuity noise. The sound source analysis device 1422 may analyze the change slope of the sound source using subjective hearing evaluation, AI model prediction, or a signal processing analysis method.

The sound source analysis device 1422 may obtain an accumulation slope of an envelope of the sound source and may determine whether the sound source is music of a type, volume of which is rapidly changed or is slowly changed. A sound source with a small change in volume may be advantageous to mask continuity noise.

The sound source analysis device 1422 may analyze an envelope of a signal of a sound source stored in a database 1421 of FIG. 1. The envelope is one of signal processing methods for providing a smoothing effect to a signal. The envelope may analyze the entire frequency band at a time and may divide and analyze the entire frequency band for each frequency band.

As an example, the sound source analysis device 1422 may filter the vicinity (710 Hz to 1400 Hz) of the band of 1000 Hz and may analyze an envelope to mask noise using a softly connected sound source when setting a frequency band. The result of analyzing the envelope of time data during 5 seconds in the early portion of a sound source with a large change in volume shown in FIG. 10A is shown in FIG. 10B. When the envelope of time data during 5 seconds in the early portion of a sound source with a small change in volume shown in FIG. 11A is analyzed, the graph shown in FIG. 11B may be obtained as the analyzed result.

The sound source analysis device 1422 may determine discontinuous points from the result of analyzing the envelope and may set an interval to each discontinuous point. The sound source analysis device 1422 may execute curve fitting using a polynomial function or an exponential function for each interval for only an interval where a magnitude of sound pressure decreases among the set intervals.

As an example, referring to FIGS. 12A and 12B, the sound source analysis device 1422 may determine a discontinuous point for sample music and may execute curve fitting using a linear function. At this time, it may be possible to add absolute values of all slopes in an interval where sound pressure of the sound source decreases and an interval where the sound pressure of the sound source increases. However, it may be recommended that only the interval where the sound pressure decreases is calculated because sound pressure is rapidly changed generally at a time point when the sound is generated.

A criterion for determining a discontinuous point may use a value obtained by averaging magnitudes of sound pressure at a proper time interval Ta (e.g., 0.1 seconds) to search for a point where sound pressure is greatly changed and reduce a noise influence. Herein, when the sign of the slope of the sound pressure is changed and when the result is maintained for at least a predetermined reference time Tar (e.g., 0.2 seconds), the sound source analysis device 1422 may determine a point where the sign of the slope is changed for the first time as a discontinuous point.

Referring to Table 2 below, when the sign of an average interval slope is changed and is maintained for at least 0.2 seconds, the sound source analysis device 1422 may determine a point of 0.7 seconds when the sign of the average interval slope is changed for the first time as a discontinuous point.

TABLE 2

| Time (second) | Average interval slope | Determination of discontinuous point | Determination basis |
| --- | --- | --- | --- |
| 0.1 | −1 | x | |
| 0.2 | −1.2 | x | Excluded because of being the same as previous code |
| 0.3 | −1.3 | x | Excluded because of being the same as previous code |
| 0.4 | +0.5 | x | Excluded because of being kept too short |
| 0.5 | −1.1 | x | Excluded because of being the same as previous code |
| 0.6 | −1.3 | x | Excluded because of being the same as previous code |
| 0.7 | +0.7 | o | Change sign, keep reference time, and meet first value |
| 0.8 | +1.5 | x | Change sign and keep reference time. It is second value |

The sound source analysis device 1422 may calculate an envelope accumulation slope $S_{env}$ by curve fitting. In other words, the sound source analysis device 1422 may perform curve fitting of an interval from a previous discontinuous point to a next discontinuous point using a linear function, a quadratic function, a quartic function, an exponential function, or the like. The envelope accumulation slope $S_{env}$ may be represented as Equation 4 below.

$$S_{env} = \sum_{j=1}^{j=n} \sum_{i=1}^{i=m(j)} \mathrm{abs}(f'_j(delT * i))/TL \qquad \text{[Equation 4]}$$

Herein, j is the discontinuous interval number, i is the slope measurement point number in each discontinuous interval, n is the entire number of discontinuous intervals, m (j) is the number of all measurement points in the jth discontinuous interval, delT is the time interval (e.g., 0.2 seconds) when the slope is measured, $f_j$ is the function for curve-fitting the envelope in the jth discontinuous interval, $f'_j(delT*i)$ is the result of curve-fitting the envelope in the jth discontinuous interval and calculating the instantaneous slope in the ith time, and TL is the total time (e.g., 2.2 seconds) of the entire analysis interval of the sound source.

The sound source analysis device 1422 may calculate an instantaneous slope for each time from a start point of the interval to an end point of the interval after performing curve fitting. The sound source analysis device 1422 may average absolute values of the calculated instantaneous slopes for the interval, may repeat it for all intervals to add the results, and may divide the added value by the total time.

A user may determine whether to use any function for curve fitting with regard to the amount of calculation and performance. As shown in FIG. 13 and Table 3 below, the sufficiently accurate result may be obtained while being quickly calculated only using the linear function.

high or low while a user directly listen to preference music stored in a database 1421 of FIG. 1.

As another example, when performing the analysis using the AI model prediction, the sound source analysis device 1422 may generate a deep learning model for previously classifying whether the voice is high or low from music or previously performing a regression prediction of a voice coverage rate. A deep neural network, an LSTM algorithm, and/or the like may be used as the deep learning model.

The sound source analysis device 1422 may previously train the deep learning model through supervised learning using a plurality of sound sources (or a plurality of pieces of music). The sound source analysis device 1422 may input pieces of preference music stored in the database 1421 to the deep learning model in turn, may classify and predict whether the voice in music is high or low or may perform regression prediction of the voice coverage rate, and may store the results in the database 1421. For example, the sound source analysis device 1422 may store a voice coverage rate in No. 1 music as 80% and may store a voice coverage rate in No. 2 music as 0%.

The voice coverage rate may be a subjective value based on data classified in advance by the user for supervised learning. For example, rap music data with lyrics at a very high speed may be set to 100%, dance music data with relatively fast lyrics may be set to 70%, ballad music data with relatively slow lyrics may be set to 60%, and song and instrumental data without voice may be set to 0% to perform learning.

Next, a description will be given of a method for determining other noise suitability in the sound source analysis device 1422.

When the current noise does not correspond to any one of road surface noise, impact noise, continuity noise, or conversational noise, the sound source analysis device 1422

TABLE 3

| Time (second) | j | i | $f_j$ | $f'_j(delT * i)$ | $\sum_{i=1}^{i=m(j)} \mathrm{abs}(f'_j(delT * i))$ | $\Sigma_{j=1}^{j=n}\Sigma_{i=1}^{i=m(j)}\mathrm{abs}(f'_j(delT * i))/TL$ |
|---|---|---|---|---|---|---|
| 1.0 | 1 | 1 | y = | −1.2 | 4.8 | (4.8 + 3 + 3)/ |
| 1.2 | 1 | 2 | −1.2x + 4 | −1.2 |  | 2.2 = 0.818 |
| 1.4 | 1 | 3 |  | −1.2 |  |  |
| 1.6 | 1 | 4 |  | −1.2 |  |  |
| 1.8 | 2 | 1 | y = | −1 | 3 |  |
| 2.0 | 2 | 2 | −1.0x + 3 | −1 |  |  |
| 2.2 | 2 | 3 |  | −1 |  |  |
| 2.4 | 3 | 1 | y = | −0.6 | 3 |  |
| 2.6 | 3 | 2 | −0.6x + 4 | −0.6 |  |  |
| 2.8 | 3 | 3 |  | −0.6 |  |  |
| 3.0 | 3 | 4 |  | −0.6 |  |  |
| 3.2 | 3 | 5 |  | −0.6 |  |  |

Next, a description will be given of a method for analyzing a voice coverage rate in the sound source analysis device 1422.

The sound source analysis device 1422 may determine whether the voice of a person is sufficiently included in the sound source to select music with lyrics and mask environmental noise classified as conversational noise. The sound source analysis device 1422 may perform an analysis using subjective hearing evaluation or AI model prediction.

As an example, when performing the analysis using the subjective hearing evaluation, the sound source analysis device 1422 may roughly determine whether the voice is may classify the current noise as other noise and may execute a sound source analysis for the other noise to select music suitable for the other noise and play the selected music.

The sound source analysis device 1422 may calculate other noise suitability using Equation 5 below to select music suitable for masking noise (i.e., other noise) in which all of features of the road surface noise, the impact noise, the continuity noise, and the conversational noise are uniformly included. The sound source analysis device 1422 may calculate numerical values of the other noise suitability for all pieces of music and may select music with the highest value.

$$FIT = C2*Bi/(Bsum/Nmusic) + \\ C3*Ei/(Esum/Nmusic) + C4*Ti/(Tsum/Nmusic)$$ [Equation 5]

Herein, Nmusic is the number of pieces of music which proceed with the analysis, Bi is the beat intensity of the ith music, Bsum is the sum of beat intensity of all pieces of music, Ei is the envelope accumulation slope of the ith music, Esum is the sum of envelope accumulation slopes of all pieces of music, Ti is the voice coverage rate of the ith music, Tsum is the sum of the voice coverage rates of all the pieces of music, and C2 to C4 are weight constants. C2 to C4 may be randomly set by a system developer in advance, and It is good to put a weight on a specific component and all of C2 to C4 may be used as "1". The values of the above-mentioned variables may be calculated through the process of analyzing the beat intensity of the sound source, the process of analyzing the change slope of the sound source, and the process of analyzing the voice of the sound source, which are described above.

Hereinafter, a description will be given of a method for setting sound source suitable for masking currently generated noise in a sound source selection device 1423 of FIG. 1.

The sound source selection device 1423 may select music which is most suitable for a noise type and a noise/vibration spectrum measured in real time, using the result of analyzing a feature of each of the sound sources previously stored in the database 1421.

The sound source selection device 1423 may analyze features (e.g., a vibration level, a noise level, and a noise type) of the measured vibration noise, may access features (e.g., beat intensity, a main frequency band, an envelope accumulation slope, a voice coverage rate, and other noise suitability) of all preference sound sources previously analyzed and stored in the database 1421, and may select a sound source which is most suitable for current environmental noise. For example, when the type of the measured environmental noise is road surface noise, the sound source selection device 1423 may select dance music with a strong beat and a reinforced mid-low sound as a masking sound source. When the type of the measured environmental noise is impact noise, the sound source selection device 1423 may select dance music with a strong beat and a reinforced mid-high sound as the masking sound source. When the type of the measured environmental noise is continuity noise, the sound source selection device 1423 may select classical music (e.g., Autumn from Vivaldi's 'The Four Seasons'), which is strong and is softly connected, as the masking sound source. When the type of the measured environmental noise is conversational noise, the sound source selection device 1423 may select rap music, which is powerful and has high lyrics delivery, as the masking sound source. When the type of the measured environmental noise is other noise, the sound source selection device 1423 may select music, which has a strong beat, is softly connected, and has enough lyrics, as the masking sound source.

Next, a description will be given of a method for adjusting volume of a masking sound source in a volume adjustment device 1431 of FIG. 1.

The volume adjustment device 1431 may automatically adjust volume of the selected sound source in response to the level of the measured vibration and noise to cause volume not to be excessive at the same as masking ambient environmental noise, thus allowing the user not to feel burdened listening to the sound.

The volume adjustment device 1431 may adjust the volume of the masking sound source to be greater than a magnitude of ambient noise by a predetermined value to provide a masking effect. Furthermore, the volume adjustment device 1431 may change a difference between the volume of the masking sound source and the magnitude of the ambient noise as the ambient noise is low and high to balance the sound source and the noise and may set an upper limit and a lower limit to the volume of the sound source to maintain a suitable level.

The volume adjustment device 1431 may adjust the volume of the sound source depending on a volume formula and a condition in Table 4 below.

TABLE 4

| Volume formula | Condition | Meaning |
| --- | --- | --- |
| Va = Vmin | Vm < Vmin | Play sound source in minimum level set by developer when environmental noise is low |
| Va = Vm + Cv1 | Vmin ≤ Vm < Vq | Play sound source at volume considerably greater than measured noise when environmental noise is relatively low |
| Va = Vm + Cv2 | Vq ≤ Vm < Vq + 12 | Play sound source at volume of proper value known to be suitable for masking when environmental noise is in normal magnitude (within 400% of quiet level) |
| Va = Vm + Cv3 | Vq + 12 ≤ Vm < Vmax | Play sound source at volume slightly greater than measured noise when environmental noise is high |
| Va = Vmax | Vm ≥ Vmax | Play sound source in maximum level set by developer when environmental noise is high |

Herein, Va is the sound pressure level dB of the sound source to be played, Vm is the environmental noise level dB measured in real time, Vq is the reference noise level dB corresponding to when the ambient noise is quiet, Vmin is the minimum sound pressure level dB preset by the developer, Vmax is the maximum sound pressure level dB preset by the developer, and Cv1, Cv2, and Cv3 are volume margin constants dB for each interval. Cv1, Cv2, and Cv3 are the volume where the volume of the sound source known to be suitable for masking based on existing studies is greater than noise by 3 dB, which may be recommended as 5, 3, and 1 as it is recommended to make it larger than the volume of the sound source to give a sufficient masking effect when the noise is low, and use a value less than the volume of the sound source such that the excessively high volume is not burdened when the noise is high.

Embodiments of the present disclosure may recommend music capable of well matching a surrounding environment and masking ambient environmental noise among pieces of music a user prefers while a mobility is driving and automatically adjust and provide volume of the music based on a level of the environmental noise, thus allowing the user to enjoy meetings or hobbies (e.g., reading, listening to music, playing games, and the like) without being influenced by ambient environmental noise in the interior of the mobility.

Furthermore, embodiments of the present disclosure may implement a soundscape which is not influenced by ambient environmental noise even in specific spaces such as an office, a meeting room, and a cafe as well as a vehicle and is suitable for the space.

Furthermore, embodiments of the present disclosure may set various autonomous sensory meridian response (ASMR) sound sources (e.g., natural sounds, white noise, and the like) or the like as well as preference music of the user to sound sources suitable of masking ambient environmental noise to play the set sound sources, thus implementing a soundscape suitable for a mobility environment.

Furthermore, embodiments of the present disclosure may allow the user to listen to music which suits his or her taste in various spaces and focus more on his or her work or hobbies without paying attention to ambient environmental noise and may automatically adjust a hearing system depending on a purpose and an environment of the user, thus providing the user with feeling comfortable and cared for.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims. Therefore, embodiments of the present disclosure are not intended to limit the technical spirit of the present disclosure, but provided only for the illustrative purpose. The scope of the present disclosure should be construed on the basis of the accompanying claims, and all the technical ideas within the scope equivalent to the claims should be included in the scope of the present disclosure.

What is claimed is:

1. A sound system for a vehicle, the sound system comprising:
   a noise meter configured to measure environmental noise generated around the vehicle;
   a vibration meter configured to measure vibration generated by the vehicle; and
   a processor connected with the noise meter and the vibration meter,
   wherein the processor is configured to:
      determine a noise type by analyzing features of the vibration and the environmental noise respectively measured by the vibration meter and the noise meter;
      select a sound source matched with the noise type among sound sources previously stored in a database; and
      play and output the selected sound source.

2. The sound system of claim 1, wherein the processor is configured to:
   determine whether the vibration is greater than or equal to a predetermined reference level;
   determine whether the vibration continues for at least a predetermined reference time in response to determining that the vibration is greater than or equal to the predetermined reference level; and
   determine the noise type as road surface noise in response to determining that the vibration continues for at least the predetermined reference time.

3. The sound system of claim 1, wherein the processor is configured to:
   analyze the environmental noise and extract a noise spectrum from the environmental noise; and
   analyze the noise spectrum using an artificial intelligence (AI) model and classify the noise type.

4. The sound system of claim 3, wherein the processor is configured to perform short-time fast Fourier transform (FFT) of the environmental noise to calculate the noise spectrum.

5. The sound system of claim 3, wherein the noise spectrum is implemented as at least one of a Mel-spectrum or a constant-Q power spectrum.

6. The sound system of claim 3, wherein the AI model is composed of at least one of a convolutional neural network (CNN) algorithm or a long short-term memory (LSTM) algorithm.

7. The sound system of claim 3, wherein the processor is configured to classify a noise type of the environmental noise as any one of impact noise, continuity noise, conversational noise, or other noise.

8. The sound system of claim 1, wherein the processor is configured to:
   analyze beat intensity, a volume change slope, a voice coverage rate, and other noise suitability for each of the previously stored sound sources;
   store the analyzed results in the database; and
   adjust a volume of the selected sound source based on levels of the vibration and the environmental noise.

9. The sound system of claim 1, wherein the noise meter includes a microphone configured to measure the environmental noise generated around the vehicle, and
   wherein the vibration meter includes a vibration accelerometer configured to measure vibration acceleration using a vibration sensor installed in a delivery path in which road surface noise is delivered in the vehicle.

10. A vehicle comprising the sound system of claim 1.

11. A method for implementing a sound of a sound system for a vehicle, the method comprising:
   measuring environmental noise generated around the vehicle using a noise meter included in the sound system for the vehicle;
   measuring vibration generated in the vehicle using a vibration meter included in the sound system for the vehicle;
   determining, by a processor, a noise type by analyzing features of the vibration and the environmental noise;
   selecting, by the processor, a sound source matched with the noise type among sound sources previously stored in a database included in the sound system for the vehicle; and
   playing and outputting, by the processor, the selected sound source.

12. The method of claim 11, wherein the determining of the noise type includes:
   determining whether the vibration is greater than or equal to a predetermined reference level;
   determining whether the vibration continues for at least a predetermined reference time in response to determining that the vibration is greater than or equal to the predetermined reference level; and
   determining the noise type as road surface noise in response to determining that the vibration continues for at least the predetermined reference time.

13. The method of claim 11, wherein the determining of the noise type includes:
   analyzing the environmental noise and extracting a noise spectrum from the environmental noise; and
   analyzing the noise spectrum using an AI model and classifying the noise type.

14. The method of claim 13, wherein the extracting of the noise spectrum includes:
performing short-time FFT of the environmental noise to calculate the noise spectrum.

15. The method of claim 13, wherein the noise spectrum is implemented as at least one of a Mel-spectrum or a constant-Q power spectrum.

16. The method of claim 13, wherein the AI model is composed of at least one of a convolutional neural network (CNN) algorithm or an LSTM algorithm.

17. The method of claim 13, wherein the extracting of the noise spectrum includes:
classifying a noise type of the environmental noise as any one of impact noise, continuity noise, conversational noise, or other noise.

18. The method of claim 11, further comprising:
analyzing beat intensity, a volume change slope, a voice coverage rate, and other noise suitability for each of the previously stored sound sources and storing the analyzed results in the database.

19. The method of claim 11, wherein the playing and outputting of the selected sound source includes:
adjusting volume of the selected sound source based on levels of the vibration and the environmental noise.

20. The method of claim 11, wherein the measuring of the environmental noise includes:
measuring the environmental noise generated around the vehicle using a microphone, and
wherein the measuring of the vibration includes:
measuring vibration acceleration using a vibration sensor installed in a delivery path in which road surface noise is delivered in the vehicle.

* * * * *